(12) United States Patent
Maeda et al.

(10) Patent No.: US 6,292,673 B1
(45) Date of Patent: Sep. 18, 2001

(54) RADIO SIGNAL TRANSMITTER

(75) Inventors: Kazuki Maeda, Neyagawa; Hiroyuki Sasai, Katano; Kouichi Masuda, Hirakata; Susumu Morikura, Yawata, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/343,681

(22) Filed: Jun. 30, 1999

(30) Foreign Application Priority Data

Jun. 11, 1999 (JP) ................................................. 10-284310

(51) Int. Cl.$^7$ ........................................................ H04B 7/00
(52) U.S. Cl. ............................ 455/522; 455/561; 455/91
(58) Field of Search ..................................... 455/522, 561, 455/67.1, 90, 91, 93, 95, 120, 552, 553; 370/335, 342; 359/152, 154, 157, 174, 180

(56) References Cited

U.S. PATENT DOCUMENTS

| | | | |
|---|---|---|---|
| 5,457,811 | * 10/1995 | Lemson | 455/67.1 |
| 5,566,165 | * 10/1996 | Sawahashi et al. | 370/342 |
| 5,642,378 | * 6/1997 | Denheyer et al. | 455/553 |
| 5,751,705 | * 5/1998 | Sato | 370/335 |
| 6,173,162 | * 1/2001 | Dahlman et al. | 455/522 |

FOREIGN PATENT DOCUMENTS 6-70362    3/1994   (JP) .

OTHER PUBLICATIONS

"Fiber–Optic Transmission System for Radio Base Stations", Sanada et al., National Technical Report vol. 39, No. 4, Aug. 1993.

"Digital Cellular Telecommunication System", Research & Development Center for Radio Systems, RCR STD–27A.

"Optical Feeder Basic System Design for Microcellular Mobile Radio", Namiki et al., IEICE Trans. Commun., vol. E76–B, No. 9, Sep. 1993, pp. 1069–1077.

"CDMA Cellular System" (ARIB STD–T53 Version 1.2).

* cited by examiner

Primary Examiner—Nay Maung
Assistant Examiner—Quochien B. Vuong
(74) Attorney, Agent, or Firm—Wenderoth, Lind, & Ponack, L.L.P.

(57) ABSTRACT

A signal including an RF signal and a code division multiple access signal is transmitted so that, in relation to both of the RF signal and the code division multiple access signal, a receiving end can obtain a signal having sufficiently larger power as compared with noise and with no distortion. In order to attain this object, a separation part separates the signal into the RF signal and the code division multiple access signal at a sending end. An amplification part amplifies the RF signal with an amplification factor related to its power. An amplification part amplifies the code division multiple access signal with an amplification factor related to its power. A combination part combines the amplified RF signal and the amplified code division multiple access signal with each other.

18 Claims, 15 Drawing Sheets

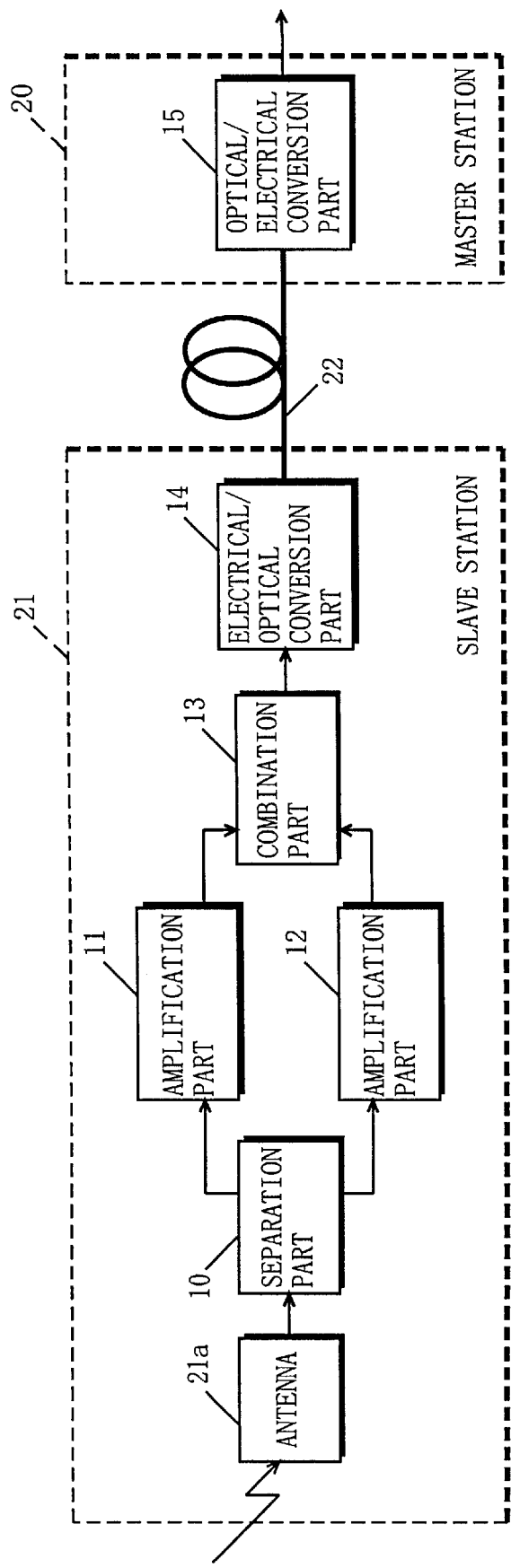
F I G. 4

F I G. 1 5  PRIOR ART

RADIO SIGNAL TRANSMITTER

BACKGROUND OF THE INVENTION

1. Field of the Invention

The present invention relates to radio signal transmitters, and more specifically, it relates to a radio signal transmitter employed in a radio base station formed by a master station and a slave station (forward station), for example, for receiving radio signals with two or more different frequency bands respectively, multiplexing the signals and transmitting the same between the master station and the slave station.

2. Description of the Background Art

In mobile communication through a portable telephone or a car phone, it is necessary to eliminate a blind zone such as underground or the inside of a tunnel where no radio waves from a radio base station reach. As that solving this problem, there is a radio base station formed by a master station without an antenna function and a plurality of slave stations having only the antenna function. The plurality of slave stations are dispersively arranged as forward stations in a blind zone or the like, and the master station and each slave station are connected to each other by an optical fiber, for example. In this case, signal transmission between the master station and the slave station is performed by an optical transmission system converting a radio signal (RF signal) to an optical signal and transmitting the same.

FIG. 13 is a block diagram showing an exemplary structure of a conventional optical transmission system employed in the aforementioned radio base station for optically transmitting a signal between the master station and the slave station. This type of optical transmission system is described in "Fiber-Optic Transmission System for Radio Base Stations" (Sanada et al., National Technical Report Vol. 39, No. 4, August 1993), for example.

Referring to FIG. 13, the conventional optical transmission system comprises an amplification part 90 amplifying an electric signal to be transmitted, an electrical/optical conversion part 91 performing electrical/optical conversion of an output signal from the amplification part 90, and an optical/electrical conversion part 92 performing optical/electrical conversion of the transmitted optical signal. The amplification part 90 and the electrical/optical conversion part 91 are provided on a sending end and the optical/electrical conversion part 92 is provided on a receiving end, while the electrical/optical conversion part 91 and the optical/electrical conversion part 92 are connected to each other by an optical fiber 93.

The electrical/optical conversion part 91 has, in relation to the power of the input signal, such a prescribed linear region that change of the strength of the output optical signal with respect to change thereof is linear. That is, when a signal having power exceeding the upper limit of this region is inputted in the electrical/optical conversion part 91, the output optical signal is distorted.

The optical/electrical conversion part 92 has, in relation to the strength of the input optical signal, such another prescribed linear region that change of the power of the output signal with respect to change thereof is linear. That is, when an optical signal having strength exceeding the upper limit of this region is inputted in the optical/electrical conversion part 92, the output signal is distorted.

The amplification part 90 has such an amplification factor that the power of the output signal from the optical/electrical conversion part 92 becomes sufficiently larger than that of noise while the power of the input signal in the electrical/optical conversion part 91 will not exceed the upper limit of the aforementioned prescribed linear region and the strength of the input optical signal in the optical/electrical conversion part 92 will not exceed the upper limit of the aforementioned another prescribed linear region. Thus, on the receiving end, a signal having sufficiently large power as compared with noise and with no distortion is obtained.

As described in "CDMA Cellular System" (Association of Radio Industries and Businesses, ARIB STD-T53 Version 1.0), in relation to mobile communication, as lines rapidly increases in number in recent years, there has been proposed employment of the CDMA (code division multiple access) system having a remarkably larger number of lines as compared with the conventional system. Recently mobile communication in the CDMA system is in part put into practice, and it is predicted that hereafter the ratio of the CDMA system occupying the mobile communication increases.

That is, the current system and the CDMA system coexist in the period up until shift to the CDMA system is completed and hence, in consideration of suppressing the facility cost, it is important to cope with the CDMA system while making the best use of the existing facility for the current system.

In the aforementioned conventional optical transmission system, consider optical transmission of an RF signal employed in the current system and a code division multiple access signal employed in the CDMA system. In this case, the receiving end cannot obtain, in relation to the code division multiple access signal, a signal having sufficiently large power as compared with noise. This is because, while in the current system and the CDMA system the power of signals is set in standards respectively, according to the standards, with reference to the power of the input signals supplied to the sending end, the power of the code division multiple access signal employed in the CDMA system is smaller than that of the RF signal employed in the conventional system.

The standards of the current system are described in "Digital Cellular Telecommunication System" (Research & Development Center for Radio Systems, RCR STD-27A) and the standards of the CDMA system are described in the aforementioned "CDMA Cellular System". An apparatus optically transmitting a code division multiple access signal is disclosed in Japanese Patent Laying-Open No. 6-70362 (Japanese Patent Application No. 4-219894), for example.

In relation to the code division multiple access signal, on the other hand, it is assumed that the amplification factor of the amplification part 90 is set high so that a signal having sufficiently large power as compared with noise is obtained. In this case, however, it is predicted in relation to the RF signal that the power of the input signal in the electrical/optical conversion part 91 exceeds the upper limit of the aforementioned prescribed linear region or the strength of the input optical signal in the optical/electrical conversion part 92 exceeds the upper limit of the aforementioned another prescribed linear region and consequently the signal obtained on the receiving end is distorted.

That is, when optically transmitting the RF signal and the code division multiple access signal in the aforementioned conventional optical transmission system, the receiving end cannot obtain, in relation to both of the RF signal and the code division multiple access signal, signals having sufficiently large power as compared with noise with no distortion whatever amplification factor of the amplification part 90 is set. Incidentally, the aforementioned Japanese Patent Laying-Open No. 6-70362 describes no means of optically transmitting both of the RF signal and the code division multiple access signal.

A problem similar to the above is quantitatively described from another point of view.

FIG. 14 is a block diagram showing the structure of a conventional radio signal transmitter.

Referring to FIG. 14, in the conventional radio signal transmitter a master station 200 and a slave station 300 are connected to each other by optical fibers 201 and 202. The optical fiber 201 is used when transmitting from the master station 200 to the slave station 300 (hereinafter referred to as a down system) an optical signal. The optical fiber 202 is used when transmitting from the slave station 300 to the master station 200 (hereinafter referred to as an up system) an optical signal.

The slave station 300 comprises an optical/electrical conversion part 301, an electrical/optical conversion part 303, a first amplification part 302, a second amplification part 304, a circulator 305 and an antenna 306.

First, down system signal transmission is described.

The optical signal sent from the master station 200 is transmitted through the optical fiber 201 to the slave station 300 present on a remote site. In the slave station 300, the optical/electrical conversion part 301 receives the optical signal sent from the master station 200 and converts the same to a radio modulation signal which is an electric signal. This radio modulation signal is amplified in the first amplification part 302 and thereafter radiated through the circulator 305 from the antenna 306. The circulator 305, which is an apparatus having a function of outputting an input from a certain terminal only to an adjacent terminal in a specific direction, outputs the input from the first amplification part 302 to the antenna 306 while outputting an input from the antenna 306 to the second amplification part 304 (as shown by arrows in FIG. 14). The radio modulation signal radiated from the antenna 306 is received by a mobile terminal (not shown) in the area.

Then, up system signal transmission is described.

Radio modulation signals having different frequencies sent from respective mobile terminals in the area are respectively received and frequency-multiplexed by the antenna 306. This frequency-multiplexed radio modulation signal is inputted through the circulator 305 into the second amplification part 304. The second amplification part 304 amplifies the inputted radio modulation signal and outputs the same to the electrical/optical conversion part 303. The electrical/optical conversion part 303 converts the radio modulation signal inputted from the second amplification part 304 to an optical signal and outputs the same. This optical signal converted in the electrical/optical conversion part 303 and thereafter outputted is transmitted through the optical fiber 202 to the master station 200 present on a remote site.

In the aforementioned structure of the slave station 300, the difference in the distances between the respective mobile terminals and the slave station 300 results in remarkable difference in received power received in the antenna 306. Therefore, the conventional radio signal transmitter employs in consideration of this difference in received power an extremely wide dynamic range for the signal of the up system and sets the optical modulation index per wave high.

An exemplary system design of this slave station 300 is described in the above-mentioned literature "Fiber-Optic Transmission System for Radio Base Stations" by Sanada et al. In this literature by Sanada et al., the optical modulation index m of the up system is, assuming that the up system has two carriers, $10.7\% \leq m \leq 21.2\%$. The lower limit and the upper limit of this optical modulation index m are decided respectively by carrier-to-noise ratio (CNR) characteristics and distortion characteristics.

FIG. 15 shows the relation between the optical modulation index, CNR and distortion (in this case, "distortion IM3" which is tertiary distortion).

As understood from FIG. 15, the CNR increases with increase of the optical modulation index, and the distortion IM3 is degraded by the increase of the optical modulation index. First, the optical modulation index at the lower limit is decided by a value satisfying CNR=80 dB, and the current value of the optical modulation index is 10.7%. On the other hand, the optical modulation index at the upper limit is decided by a value satisfying distortion IM3=−84 dBc, and the current optical modulation index is 21.2%. This distortion IM3=−84 dBc is, assuming that the distortion characteristic in the overall transmitter is −80 dBc, a distortion quantity which can be allowed by a semiconductor laser diode (LD) module employed as an optical/electrical conversion part in an optical sender.

While the aforementioned literature by Sanada et al. makes performance evaluation in the case of two carriers, in an actual system carriers for the up system are multi-carriers. In the literature by Sanada et al. up to 32 carriers at the maximum are assumed. In this regard, evaluation of distortion characteristics made with two carriers is made with multiple carriers.

In the case of multi-carrier transmission, not the distortion IM3 per wave but distortion of a composite triple beat (CTB) must be taken into consideration as the distortion characteristics. This distortion CTB in multi-carrier transmission is given by a composite number which is the number of tertiary distortion caused at the same frequency and the distortion IM3.

The relation between the aforementioned composite number and the carrier number is, as described in literature "Optical Feeder Basic System Design for Microcellular Mobile Radio" by Junji Namiki et al. (IEICE TRANS. COMMUN., VOL. E76-B, No. 9 September 1993, pp. 1069 to 1077), obtained by the following equation (1):

$$Nc=M*(N-M+1)/2+((N-3)^2-5)-(1-(-1))^{-N}*(-1)^{N+M} \qquad (1)$$

In the above equation (1), N represents the carrier number, M represents an M-th frequency band in N carriers, and Nc represents the composite number in the M-th frequency band. FIG. 16 shows a result obtained by calculating the relation between the carrier number and the composite number with the above equation (1).

As to the relation between the distortion IM3 and the distortion CTB in the same frequency band, assuming that D2 [dBc] represents the distortion IM3 caused when transmitting two carriers having a optical modulation index m2 [%] and DN [dBc] represents the distortion CTB caused when transmitting N carriers having a optical modulation index mN [%] of the same transmission system, DN is estimated with the composite number Nc in the following equation (2):

$$DN=D2+10*\log(Nc)+2*20*\log(mN/m2) \qquad (2)$$

Assuming that the value D2 of the distortion IM3 when mN=10.7% and 21.2% and m2=20% is −85 dBc, the relation between the distortion quantity DN and the composite number when mN=10.7% and 21.2% can be obtained from the above equation (2). FIG. 17 shows this relation. Obtaining from FIG. 17 a composite number satisfying −84 dBc which is the spec of the distortion characteristic DN of an LD module, it becomes "15" when mN=10.7% and becomes "1" when mN=21.2%. Further, the carrier number can be obtained from the relation between the composite number and the carrier number shown in FIG. 16, such that the carrier number becomes "8" carriers when the modulation factor is 10.7%, and becomes "3" carriers when the modulation factor is 21.2%.

The aforementioned carrier number is the number of mobile terminals performing sending in a certain area at a place closest to the slave station 300. In the range of this carrier number, influence exerted by tertiary distortion resulting from combination of the carriers on a signal sent at a place most separate from the slave station 300 (the receiving level in the antenna 306 is at the minimum) is in an allowable range.

However, the aforementioned conventional radio signal transmitter requires an extremely wide dynamic range for signals of the up system as described above, and allows the optical modulation index per wave to be set high. Therefore, when employing a communication system with an existing frequency band and a communication system utilizing another frequency band (e.g., a CDMA communication system) in the aforementioned conventional radio signal transmitter, such a problem arises that the distortion characteristic is degraded.

And this problem is essentially similar to the problem caused in the aforementioned conventional optical transmission system.

That is, when further performing CMDA communication in the aforementioned conventional signal transmitter, the CDMA signal (code division multiple access signal) is subjected to transmission power control and the received power in the antenna 306 is suppressed small and hence, in order to ensure sufficient CNR after optical transmission, the amplification factor of the amplification part 304 must be set large. However, the conventional radio modulation signal (RF signal) is not subjected to transmission power control and the received power in the antenna 306 may enlarge in some cases, and hence, assuming that the amplification factor of the amplification part 304 is set large as described above, there is a possibility that the conventional radio modulation signal is distorted.

Further, the aforementioned problem can arise not only in the case of optically transmitting the RF signal and the code division multiple access signal but also when transmitting a first radio signal and a second radio signal different in power from each other (this is not restricted to optical transmission either).

SUMMARY OF THE INVENTION

Therefore, an object of the present invention is to provide a radio signal transmitter, employed in a radio base station formed by a master station and one or more slave stations, for example, which can transmit a signal including a first radio signal and a second radio signal different in power from each other so that in relation to both of the first radio signal and the second radio signal a receiving end obtains a signal having sufficiently large power as compared with noise and with no distortion, particularly a radio signal transmitter which can optically transmit a signal including an RF signal and a code division multiple access signal so that in relation to both of the RF signal and the code division multiple access signal a receiving end obtains a signal having sufficiently large power as compared with noise and with no distortion.

The present invention has the following features to solve the problem above.

A first aspect of the present invention is directed to a radio signal transmitter for transmitting a signal including both of a radio signal which is in a first frequency band and not subjected to transmission power limitation (hereinafter referred to as a first radio signal) and a radio signal which is in a second frequency band different from the first frequency band and subjected to transmission power limitation (hereinafter referred to as a second radio signal), comprising at a sending end
   a separation part separating the signal into the first radio signal and the second radio signal,
   a first amplification part amplifying the first radio signal with an amplification factor related to the power of the first radio signal,
   a second amplification part amplifying the second radio signal with an amplification factor related to the power of the second radio signal, and
   a combination part combining the amplified first radio signal and the amplified second radio signal.

As described above, in the first aspect, when transmitting the signal including the first radio signal and the second radio signal different in power from each other, the signal is separated into the first radio signal and the second radio signal to be amplified with amplification factors related to the respective signal power and transmitted, whereby the first radio signal and the second radio signal obtained at a receiving end can be both made to have sufficient power as compared with noise.

According to a second aspect, in the first aspect,
   the radio signal transmitter further comprises at the sending end an electrical/optical conversion part performing electrical/optical conversion of an output signal of the combination part, and
   comprises at a receiving end an optical/electrical conversion part performing optical/electrical conversion of an output optical signal of the electrical/optical conversion part, and
   the sending end and the receiving end are connected to each other by an optical fiber.

As described above, in the second aspect, the signal is optically transmitted.

According to a third aspect, in the first aspect, the second radio signal is a signal subjected to code division multiple access.

As described above, in the third aspect, a code division multiple access signal is used as the second radio signal. Thus, a distortion signal generated from the second radio signal also has a wide band and its peak power is extremely low, whereby, also when distortion is caused in the first radio frequency band, the first radio signal is not influenced. As the first radio signal, an RF signal (a radio signal for mobile communication such as a frequency multiplex division access signal different from a code division multiple access signal), for example, is employed.

According to a fourth aspect, in the third aspect, the radio signal transmitter further comprises at the sending end an electrical/optical conversion part performing electrical/optical conversion of an output signal from the combination part, and
   comprises at a receiving end an optical/electrical conversion part performing optical/electrical conversion of an output optical signal of the electrical/optical conversion part, and the sending end and the receiving end are connected to each other by an optical fiber.

As described above, in the fourth aspect, the signal is optically transmitted.

According to a fifth aspect, in the fourth aspect, the first amplification part and the second amplification part respectively further perform amplification with such amplification factors that the strength of an input optical signal in the optical/electrical conversion part will not exceed the upper limit of a linear region of the optical/electrical conversion part.

As described above, in the fifth aspect, the first radio signal and the second radio signal obtained at the receiving end can be both made to have sufficiently large power as compared with noise without causing distortion in optical/electrical conversion.

According to a sixth aspect, in the fifth aspect, the optical/electrical conversion part is formed by an optical/electrical conversion device and an amplifier previously amplifying an output signal of the optical/electrical conversion device.

As described above, in the sixth aspect (and the following ninth, twelfth and fifteenth aspects), also when the optical/electrical conversion part includes an amplifier (preamplifier) having a narrow linear region for previously amplifying the output of the optical/electrical conversion device, the first radio signal and the second radio signal obtained at the receiving end can be both made to have sufficiently large power as compared with noise without causing distortion in optical/electrical conversion.

According to a seventh aspect, in the fourth aspect, the first amplification part and the second amplification part respectively further perform amplification with such amplification factors that the power of an input signal in the electrical/optical conversion part will not exceed the upper limit of a linear region of the electrical/optical conversion part.

As described above, in the seventh aspect, the first radio signal and the second radio signal obtained at the receiving end can be both made to have sufficiently large power as compared with noise without causing distortion in electrical/optical conversion.

According to an eighth aspect, in the seventh aspect, the first amplification part and the second amplification part respectively further perform amplification with such amplification factors that the strength of an input optical signal in the optical/electrical conversion part will not exceed the upper limit of a linear region of the optical/electrical conversion part.

As described above, in the eighth aspect, the first radio signal and the second radio signal obtained at the receiving end can be both made to have sufficiently large power as compared with noise without causing distortion in electrical/optical conversion and optical/electrical conversion.

According to a ninth aspect, in the eighth aspect, the optical/electrical conversion part is formed by an optical/electrical conversion device and an amplifier previously amplifying an output signal of the optical/electrical conversion device.

A tenth aspect of the present invention is directed to a radio signal transmitter for transmitting a signal including both of a radio signal which is in a first frequency band and not subjected to transmission power limitation (hereinafter referred to as a first radio signal) and a radio signal which is in a second frequency band different from the first frequency band and subjected to transmission power limitation (hereinafter referred to as a second radio signal), a sending end and a receiving end are connected to each other by an optical fiber, and the radio signal transmitter comprises at the sending end a separation part separating the signal into the first radio signal and the second radio signal, a first amplification part amplifying the first radio signal with an amplification factor related to the power of the first radio signal, a second amplification part amplifying the second radio signal with an amplification factor related to the power of the second radio signal, a first electrical/optical conversion part performing electrical/optical conversion of the amplified first radio signal, a second electrical/optical conversion part performing electrical/optical conversion of the amplified second radio signal, and a wavelength division multiplexing part wavelength-division-multiplexing a first optical signal obtained by conversion through the first electrical/optical conversion part and a second optical signal obtained by conversion through the electrical/optical conversion part, and comprises at the receiving end a wavelength division demultiplexing part wavelength-separating an output optical signal of the wavelength division multiplexing part into the first optical signal and the second optical signal, a first optical/electrical conversion part performing optical/electrical conversion of the first optical signal, and a second optical/electrical conversion part performing optical/electrical conversion of the second optical signal.

As described above, in the tenth aspect, when optically transmitting the signal including the first radio signal and the second radio signal different in power from each other, the signal is separated into the first radio signal and the second radio signal to be amplified with amplification factors related to the respective signal power and optically transmitted, whereby the first radio signal and the second radio signal received at the receiving end can be both made to have sufficiently large power as compared with noise.

According to an eleventh aspect, in the tenth aspect, the second radio signal is a signal subjected to code division multiple access.

As described above, in the eleventh aspect, a code division multiple access signal is used as the second radio signal. Thus, a distortion signal generated from the second radio signal also has a wide band and its peak power is extremely low, whereby, also when distortion is caused in the first radio frequency band, the first radio signal is not influenced. As the first radio signal, an RF signal (a radio signal for mobile communication such as a frequency multiplex division access signal different from a code division multiple access signal), for example, is employed.

According to a twelfth aspect, in the eleventh aspect, the first amplification part further performs amplification with such an amplification factor that the strength of an input optical signal in the first optical/electrical conversion part will not exceed the upper limit of a linear region of the first optical/electrical conversion part, and the second amplification part further performs amplification with such an amplification factor that the strength of an input optical signal in the second optical/electrical conversion part will not exceed the upper limit of a linear region of the second optical/electrical conversion part.

As described above, in the twelfth aspect, the first radio signal and the second radio signal obtained at the receiving end can be both made to have sufficiently large power as compared with noise without causing distortion in optical/electrical conversion.

According to a thirteenth aspect, in the twelfth aspect, the first optical/electrical conversion part and the second optical/electrical conversion part are respectively formed by optical/electrical conversion devices and amplifiers previously amplifying output signals of the optical/electrical conversion devices.

According to a fourteenth aspect, in the eleventh aspect, the first amplification part further performs amplification with such an amplification factor that the power of an input signal in the first electrical/optical conversion part will not exceed the upper limit of a linear region of the first electrical/optical conversion part, and the second amplification part further performs amplification with such an amplification factor that the power of an input signal in the second electrical/optical conversion part will not exceed the upper limit of a linear region of the second electrical/optical conversion part.

As described above, in the fourteenth aspect, the first radio signal and the second radio signal obtained at the receiving end can be both made to have sufficiently large power as compared with noise without causing distortion in electrical/optical conversion.

According to a fifteenth aspect, in the fourteenth aspect, the first amplification part further performs amplification with such an amplification factor that the strength of an input optical signal in the first optical/electrical conversion part will not exceed the upper limit of a linear region of the first optical/electrical conversion part, and the second amplification part further performs amplification with such an amplification factor that the strength of an input optical signal in the second optical/electrical conversion part will not exceed the upper limit of a linear region of the second optical/electrical conversion part.

As described above, in the fifteenth aspect, the first radio signal and the second radio signal obtained at the receiving end can be both made to have sufficiently large power as compared with noise without causing distortion in electrical/optical conversion and optical/electrical conversion.

According to a sixteenth aspect, in the fifteenth aspect, the first optical/electrical conversion part and the second optical/electrical conversion part are respectively formed by optical/electrical conversion devices and amplifiers previously amplifying output signals of the optical/electrical conversion devices.

A seventeenth aspect of the present invention is directed to a radio signal transmitter for transmitting both of a radio signal which is in a first frequency band and not subjected to transmission power limitation (hereinafter referred to as a first radio signal) and a radio signal which is in a second frequency band different from the first frequency band and subjected to transmission power limitation (hereinafter referred to as a second radio signal), comprising at a sending end a first amplification part amplifying the first radio signal with an amplification factor related to the power of the first radio signal, a second amplification part amplifying the second radio signal with an amplification factor related to the power of the second radio signal, and a combination part combining the amplified first radio signal and the amplified second radio signal.

As described above, in the seventeenth aspect, when transmitting the first radio signal and the second radio signal different in power from each other, the signals are amplified with amplification factors related to the respective signal power and transmitted, whereby the first radio signal and the second radio signal obtained at a receiving end can be both made to have sufficient power as compared with noise.

A eighteenth aspect of the present invention is directed to a radio signal transmitter for transmitting both of a radio signal which is in a first frequency band and not subjected to transmission power limitation (hereinafter referred to as a first radio signal) and a radio signal which is in a second frequency band different from the first frequency band and subjected to transmission power limitation (hereinafter referred to as a second radio signal), a sending end and a receiving end are connected to each other by an optical fiber, and the radio signal transmitter comprises at the sending end a first amplification part amplifying the first radio signal with an amplification factor related to the power of the first radio signal, a second amplification part amplifying the second radio signal with an amplification factor related to the power of the second radio signal, a first electrical/optical conversion part performing electrical/optical conversion of the amplified first radio signal, a second electrical/optical conversion part performing electrical/optical conversion of the amplified second radio signal, and a wavelength division multiplexing part wavelength-division-multiplexing a first optical signal obtained by conversion through the first electrical/optical conversion part and a second optical signal obtained by conversion through the electrical/optical conversion part, and comprises at the receiving end a wavelength division demultiplexing part wavelength-separating an output optical signal of the wavelength division multiplexing part into the first optical signal and the second optical signal, a first optical/electrical conversion part performing optical/electrical conversion of the first optical signal, and a second optical/electrical conversion part performing optical/electrical conversion of the second optical signal.

As described above, in the eighteenth aspect, when optically transmitting the first radio signal and the second radio signal different in power from each other, the signals are amplified with amplification factors related to the respective signal power and optically transmitted, whereby the first radio signal and the second radio signal received at the receiving end can be both made to have sufficiently large power as compared with noise.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram showing an exemplary structure of the radio base station of FIG. 2 to which the optical transmission system of FIG. 1 is applied (in the case of transmitting a signal from a slave station 21 to a master station 20);

DESCRIPTION OF THE PREFERRED EMBODIMENTS

Embodiments of the present invention are now described with reference to the drawings.

(First Embodiment)

Figure 1:
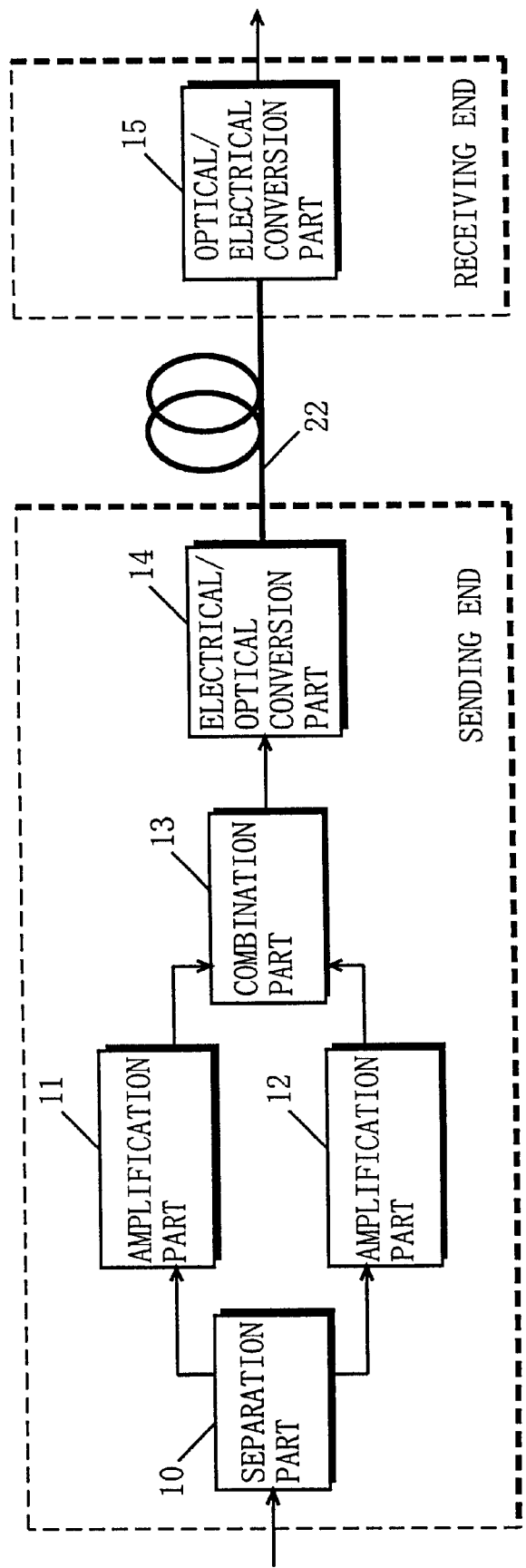
FIG. 1 is a block diagram showing the structure of an optical transmission system according to a first embodiment of the present invention.

FIG. 1 is a block diagram showing the structure of an optical transmission system according to a first embodiment of the present invention. Referring to FIG. 1, the optical transmission system comprises a separation part 10, amplification parts 11 and 12, a combination part 13, an electrical/optical conversion part 14, and an optical/electrical conversion part 15. The separation part 10, the amplification parts 11 and 12, the combination part 13 and the electrical/optical conversion part 14 are provided at a sending end, and the optical/electrical conversion part 15 is provided at a receiving end.

Figure 2:
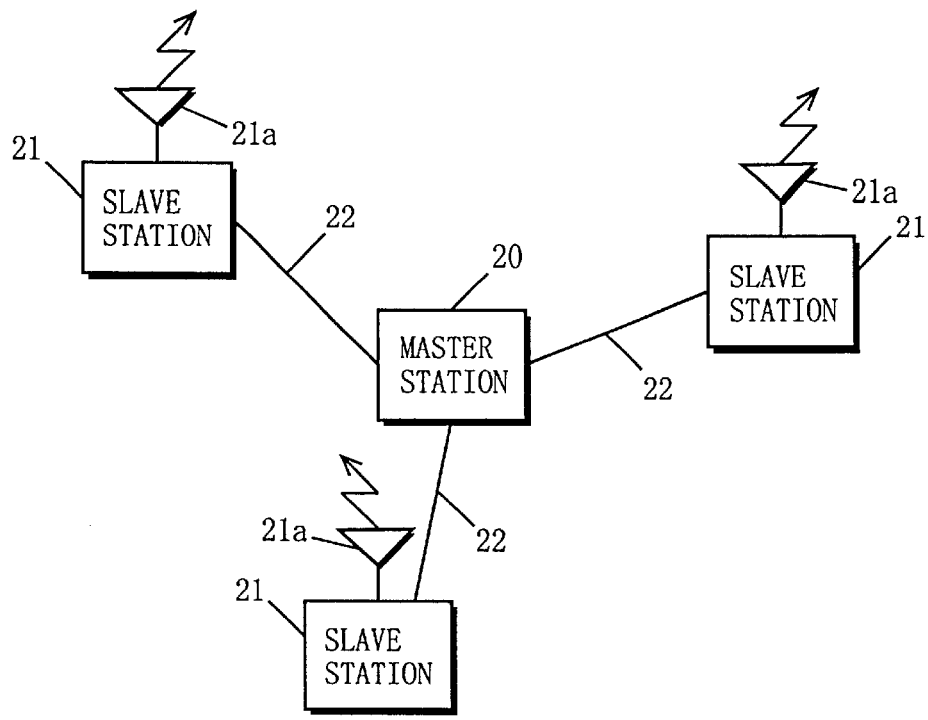
FIG. 2 is a schematic diagram showing an exemplary radio base station, to which the system of FIG. 1 is applied, for performing mobile communication by both of the current system and the CDMA system.

FIG. 2 is a schematic diagram showing an exemplary radio base station, to which the system of FIG. 1 is applied, for performing mobile communication by both of the current system and the CDMA system. Referring to FIG. 2, the radio base station is formed by a master station 20 without an antenna 21a and one or more slave stations 21 each having an antenna 21a. The one or more slave stations 21 are dispersively arranged as forward stations in a blind zone or the like, and the master station 20 and each slave station 21 are connected to each other by an optical fiber 22.

The optical transmission system of FIG. 1 is applied to the radio base station of FIG. 2, for performing signal transmission between the master station 20 and each slave station 21. That is, the system converts an input signal including an RF signal (a radio signal for mobile communication such as a frequency multiplex division access signal, for example, different from a code division multiple access signal; this also applies to the following description) and a code division multiple access signal employed in the CDMA system to an optical signal and transmits the same through the optical fiber 22.

Referring again to FIG. 1, the separation part 10 separates the input signal into the RF signal and the code division multiple access signal. The amplification part 11 amplifies the RF signal to be transmitted. The amplification part 12 amplifies the code division multiple access signal to be transmitted. The combination part 13 combines (frequency-multiplexes) the amplified RF signal and the amplified code division multiple access signal. The electrical/optical conversion part 14 performs electrical/optical conversion of the output signal of the combination part 13. The optical/electrical conversion part 15 performs optical/electrical conversion of the transmitted optical signal (output optical signal from the electrical/optical conversion part 14).

The electrical/optical conversion part 14 has, in relation to the power of the input signal, such a prescribed linear region that change of the strength of the output optical signal with respect to change thereof is linear. That is, when a signal having power exceeding the upper limit of this region is inputted in the electrical/optical conversion part 14, the output optical signal is distorted.

The optical/electrical conversion part 15 has, in relation to the strength of the input optical signal, such another prescribed linear region that change of the power of the output signal with respect to change thereof is linear. That is, when an optical signal having strength exceeding the upper limit of this region is inputted in the optical/electrical conversion part 15, the output signal is distorted.

The amplification part 11 performs amplification with such an amplification factor that the power of the RF signal included in the output signal from the optical/electrical conversion part 15 becomes sufficiently larger than that of noise. Thus, the receiving end can obtain an RF signal having sufficiently large power as compared with noise (i.e., having an excellent C/N ratio).

Most preferably, the amplification part 11 performs amplification with the aforementioned amplification factor, which is such an amplification factor that the power of the input signal in the electrical/optical conversion part 14 will not exceed the upper limit of the aforementioned prescribed linear region and the strength of the input optical signal in the optical/electrical conversion part 15 will not exceed the upper limit of the aforementioned another prescribed linear region. Thus, the receiving end can obtain an RF signal having sufficiently large power as compared with noise and with no distortion.

Figure 3A:
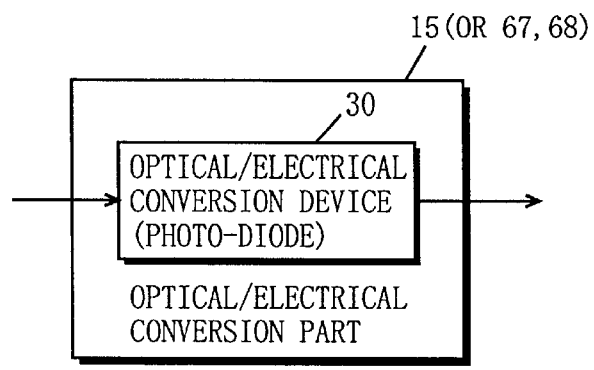
FIG. 3 is a block diagram showing the internal structure of an optical/electrical conversion part 15 of FIG. 1 (and optical/electrical conversion parts 67 and 68 of FIG. 7)
Figure 3B:
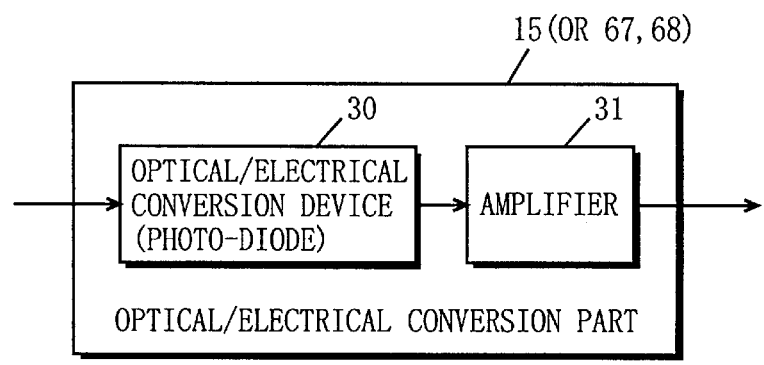

It is supplemented here that the optical/electrical conversion part 15 may be, as shown in FIGS. 3A and 3B, formed by a single optical/electrical conversion device 30 (photodiode) (FIG. 3A) or formed by an optical/electrical conversion device 30 and an amplifier (preamplifier) 31 previously amplifying an output signal of the optical/electrical conversion device 30 (FIG. 3B). In general, the optical/electrical conversion device 30 has a sufficiently wide linear region, while the amplifier 31 has a rather narrow linear region.

Hence, in the former case, i.e., when the optical/electrical conversion part 15 is formed by the single optical/electrical conversion device 30, even if not intentionally controlling the amplification factor, there is a bare possibility that the strength of the input optical signal in the optical/electrical conversion part 15 exceeds the upper limit of the aforementioned another prescribed linear region. However, in the latter case, i.e., when the optical/electrical conversion part 15 is formed by the optical/electrical conversion device 30 and the amplifier 31, it is necessary to intentionally control the amplification factor, so that the strength of the input optical signal in the optical/electrical conversion part 15 will not exceed the upper limit of the aforementioned another prescribed linear region.

The amplification part 12 performs amplification with such an amplification factor that the power of the code division multiple access signal included in the output signal from the optical/electrical conversion part 15 become s sufficiently larger than that of noise. Thus, the receiving end can obtain a code division multiple access signal having sufficiently large power as compared with noise (i.e., having an excellent C/N ratio).

Most preferably, the amplification part 12 performs amplification with the aforementioned amplification factor, which is such an amplification factor that the power of the input signal in the electrical/optical conversion part 14 will not exceed the upper limit of the aforementioned prescribed linear region and the strength of the input optical signal in the optical/electrical conversion part 15 will not exceed the upper limit of the aforementioned another prescribed linear region. Thus, the receiving end can obtain a code division multiple access signal having sufficiently large power as compared with noise and with no distortion.

As to the optical transmission system having the aforementioned structure, operations when applied to the radio base station of FIG. 2 are now described.

First, operations of transmitting a signal from the slave station 21 to the master station 20 are described.

FIG. 4 is a block diagram showing an exemplary structure of the radio base station of FIG. 2 to which the optical transmission system of FIG. 1 is applied. FIG. 4 shows elements necessary when transmitting a signal from the slave station 21 to the master station 20. Referring to FIG. 4, the slave station 21 comprising the antenna 21a is provided with the separation part 10, the amplification parts 11 and 12, the combination part 13 and the electrical/optical conversion part 14 of FIG. 1, and the master station 20 is provided with the optical/electrical conversion part 15.

In a talking area of the slave station 21, a mobile terminal for the current system and a mobile terminal for the CDMA system are mixedly provided (not shown). From these mobile terminal sides, an RF signal and a code division multiple access signal are sent toward the slave station 21. In the slave station 21, these RF signal and code division multiple access signal are received by the antenna 21a and inputted in the separation part 10. The separation part 10 separates the input signal including the RF signal and the code division multiple access signal into the RF signal and the code division multiple access signal.

Figure 5:
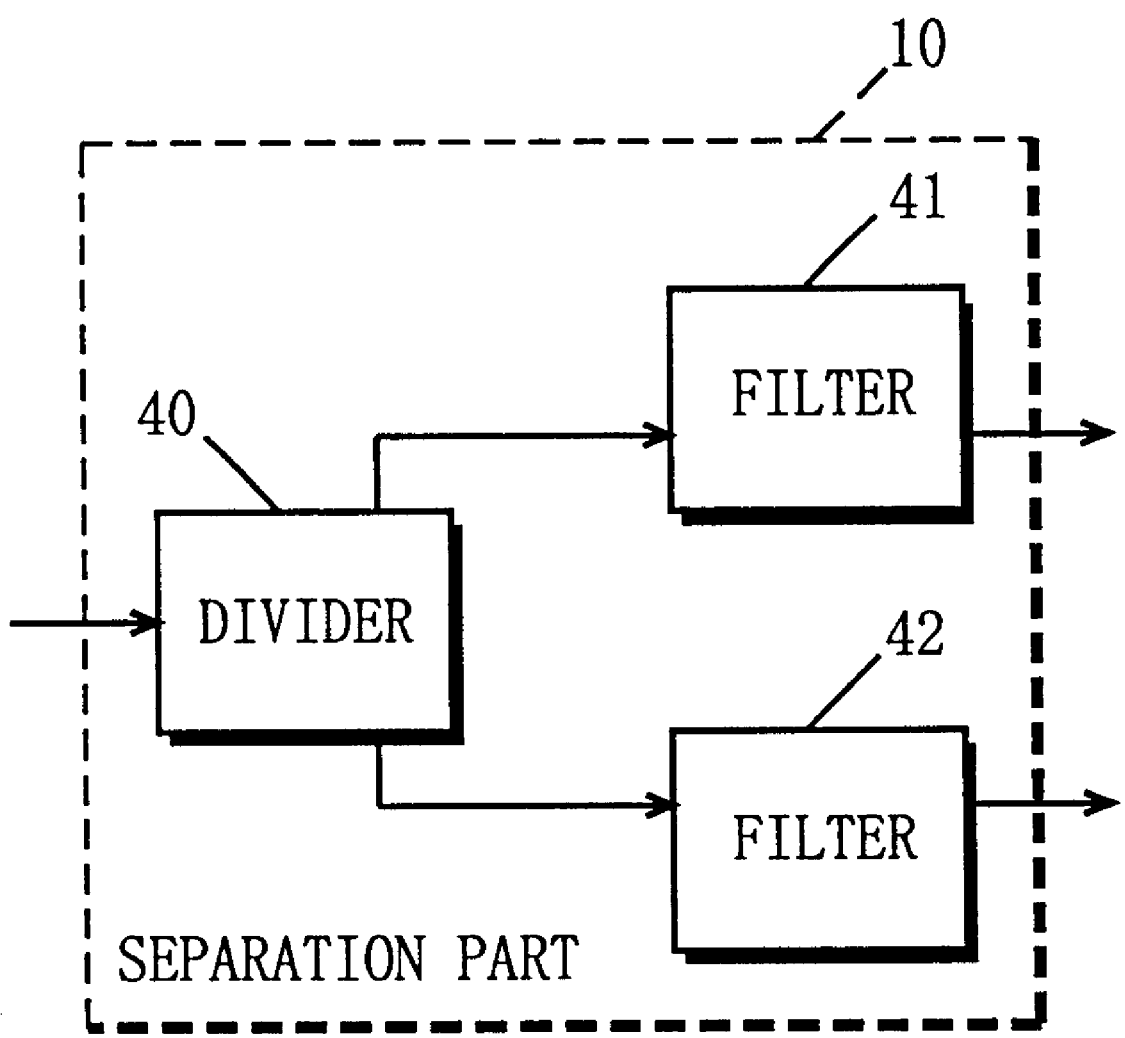
FIG. 5 is a block diagram showing an exemplary structure of a separation part 10 of FIG. 1.

The separation part 10 can be implemented employing a divider branching an input signal into two signals and filters selectively transmitting signals of specific frequencies, for example. FIG. 5 shows an exemplary structure of the separation part 10. Referring to FIG. 5, the separation part 10 includes a divider 40 and filters 41 and 42. The filter 41 is a filter having such a characteristic that its transmission band includes a band for the RF signal while including no band for the code division multiple access signal. The filter 42 is a filter having such a characteristic that its transmission band includes the band for the code division multiple access signal while including no band for the RF signal. Therefore, when the RF signal and the code division multiple access signal are inputted in the divider 40, the filter 41 outputs the RF signal and the filter 42 outputs the code division multiple access signal respectively.

Also when providing in place of the antenna 21a and the separation part 10 an antenna for the RF signal and an antenna for the code division multiple access signal, the input signal can be branched into two signals. That is, by the antenna for the RF signal and the antenna for the code division multiple access signal, a signal separating function similar to the above can be implemented.

The RF signal obtained by separation is supplied to the amplification part 11, and amplified there. On the other hand, the code division multiple access signal obtained by separation is supplied to the amplification part 12, and amplified there. The output signal of the amplification part 11 and the output signal of the amplification part 12 are combined in the combination part 13, and inputted in the electrical/optical conversion part 14. The electrical/optical conversion part 14 performs electrical/optical conversion of the input signal, and radiates the obtained optical signal into the optical fiber 22.

The optical signal outputted from the slave station 21 in the aforementioned manner propagates in the optical fiber 22 and reaches the master station 20. In the master station 20, the optical/electrical conversion part 15 performs optical/electrical conversion of the optical signal from the slave station 21. By frequency-separating the output signal of the optical/electrical conversion part 15 (a separation part therefor is not illustrated), the RF signal and the code division multiple access signal are obtained.

In the aforementioned operations, the amplification part 11 performs amplification with such an amplification factor that the power of the RF signal included in the output signal from the optical/electrical conversion part 15 becomes sufficiently larger than that of noise and the power of the input signal in the electrical/optical conversion part 14 will not exceed the upper limit of the linear region of the electrical/optical conversion part 14 while the strength of the input optical signal in the optical/electrical conversion part 15 will not exceed the upper limit of the linear region of the optical/electrical conversion part 15, whereby the RF signal obtained in the master station 20 has sufficiently large power as compared with noise, and is not distorted.

Further, the amplification part 12 performs amplification with such an amplification factor that the power of the code division multiple access signal included in the output signal from the optical/electrical conversion part 15 becomes sufficiently larger than that of noise and the power of the input signal in the electrical/optical conversion part 14 will not exceed the upper limit of the linear region of the electrical/optical conversion part 14 while the strength of the input optical signal in the optical/electrical conversion part 15 will not exceed the upper limit of the linear region of the optical/electrical conversion part 15, whereby the code division multiple access signal obtained in the master station 20 has sufficiently large power as compared with noise and is not distorted.

The amplification factors of the amplification parts 11 and 12 may be respectively fixed at predetermined values or may be adjusted during transmission in response to change of C/N ratios and distortion quantities.

Operations of transmitting a signal from the master station 20 to the slave station 21 are now described.

Figure 6:
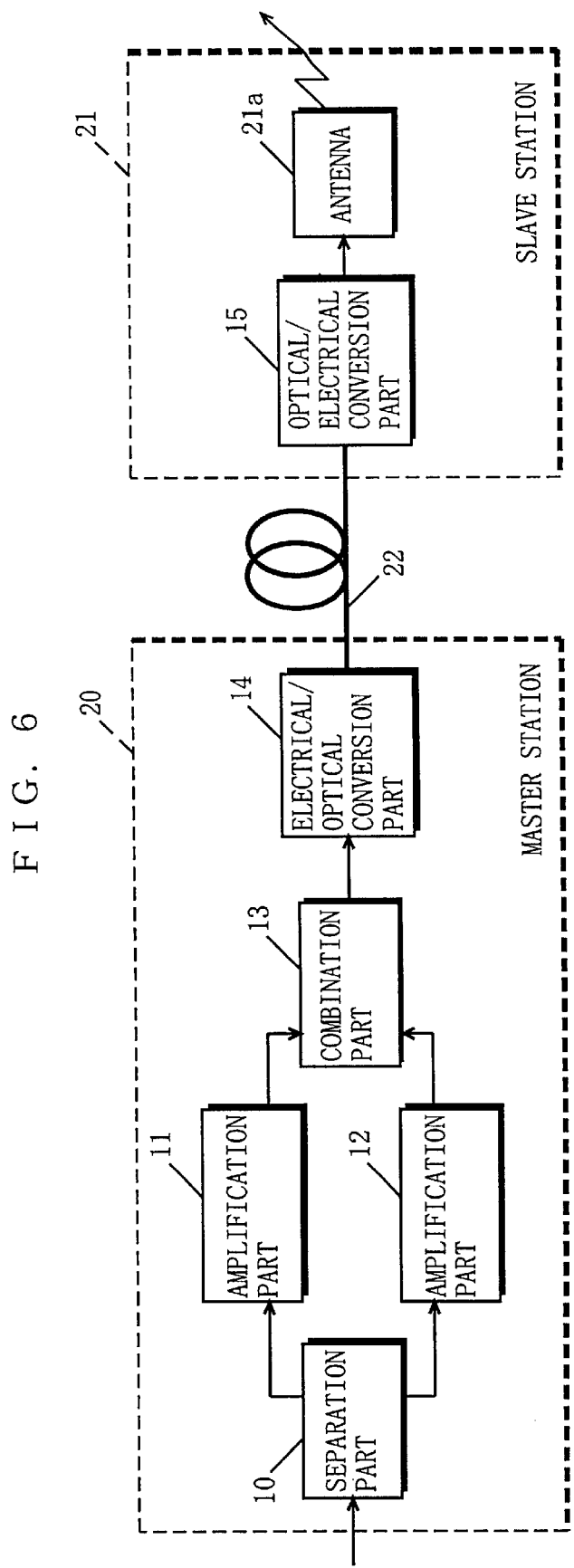
FIG. 6 is a block diagram showing another exemplary structure of the radio base station of FIG. 2 to which the optical transmission system of FIG. 1 is applied (the case of transmitting a signal from the master station 20 to the slave station 21)

FIG. 6 is a block diagram showing another exemplary structure of the radio base station of FIG. 2 to which the optical transmission system of FIG. 1 is applied. FIG. 6 shows elements necessary when transmitting a signal from the master station 20 to the slave station 21. Referring to FIG. 6, the slave station 21 comprising the antenna 21a is provided with the optical/electrical conversion part 15 of FIG. 1, and the master station 20 is provided with the separation part 10, the amplification parts 11 and 12, the combination part 13 and the electrical/optical conversion part 14.

To the master station 20, a signal including an RF signal and a code division multiple access signal is transmitted from a center station (not shown) through a prescribed transmission path. In the master station 20, the separation part 10 separates the signal from the center station into the RF signal and the code division multiple access signal.

The RF signal obtained by separation is supplied to the amplification part 11, and amplified there. On the other hand, the code division multiple access signal obtained by separation is supplied to the amplification part 12, and amplified there. The output signal of the amplification part 11 and the output signal of the amplification part 12 are combined in the combination part 13, and inputted in the electrical/optical conversion part 14. The electrical/optical conversion part 14 performs electrical/optical conversion of the input signal, and radiates the obtained optical signal into the optical fiber 22.

The optical signal outputted from the master station 20 in the aforementioned manner propagates in the optical fiber 22 and reaches the slave station 21. In the slave station 21, the optical/electrical conversion part 15 performs optical/electrical conversion of the input optical signal. By frequency-separating the output signal of the optical/electrical conversion part 15 (a separation part therefor is not illustrated), the RF signal and the code division multiple access signal are obtained. From the slave station 21, the RF signal and the code division multiple access signal obtained in the aforementioned manner are sent through the antenna 21a toward each mobile terminal in the talking area of the slave station 21.

In the aforementioned operations, the amplification part 11 performs amplification with such an amplification factor that the power of the RF signal included in the output signal from the optical/electrical conversion part 15 becomes sufficiently larger than that of noise and the power of the input signal in the electrical/optical conversion part 14 will not exceed the upper limit of the linear region of the electrical/optical conversion part 14 while the strength of the input optical signal in the optical/electrical conversion part 15 will not exceed the upper limit of the linear region of the optical/electrical conversion part 15, whereby the RF signal obtained in the slave station 21 has sufficiently large power as compared with noise and is not distorted.

Further, the amplification part 12 performs amplification with such an amplification factor that the power of the code division multiple access signal included in the output signal from the optical/electrical conversion part 15 becomes sufficiently larger than that of noise and the power of the input signal in the electrical/optical conversion part 14 will not exceed the upper limit of the linear region of the electrical/optical conversion part 14 while the strength of the input optical signal in the optical/electrical conversion part 15 will not exceed the upper limit of the linear region of the optical/electrical conversion part 15, whereby the code division multiple access signal obtained in the slave station 21 has sufficiently large power as compared with noise and is not distorted.

The amplification factors of the amplification parts 11 and 12 may be respectively fixed at predetermined values or may be adjusted during transmission in response to change of C/N ratios and distortion quantities as in the case of transmitting a signal from the slave station 21 to the master station 20.

According to the first embodiment, as hereinabove described, when transmitting the signal including the RF signal and the code division multiple access signal, the signal is separated into the RF signal and the code division multiple access signal to be amplified with amplification factors suitable for the respective power and transmitted, whereby the RF signal and the code division multiple access signal obtained at the receiving end both have sufficiently large power as compared with noise and are not distorted.

(Second Embodiment)

Figure 7:
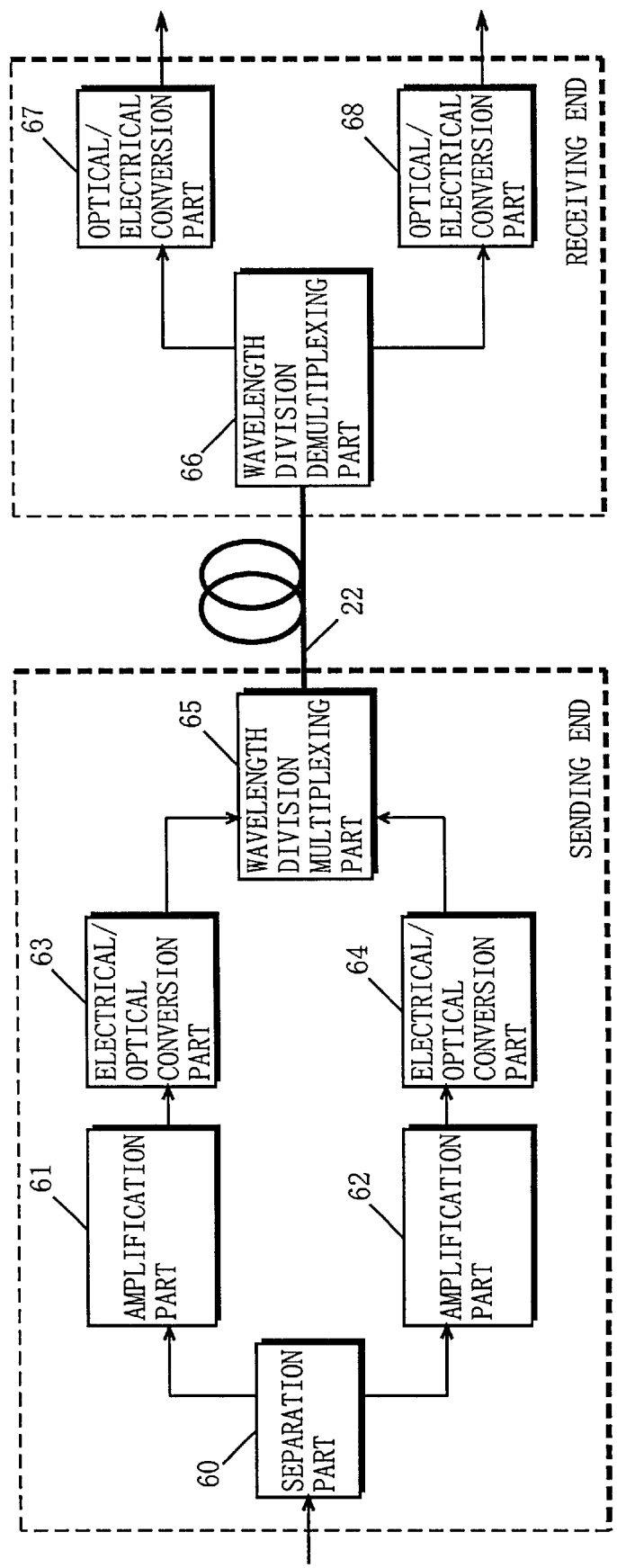
FIG. 7 is a block diagram showing the structure of an optical transmission system according to a second embodiment of the present invention.

FIG. 7 is a block diagram showing the structure of an optical transmission system according to a second embodiment of the present invention. Referring to FIG. 7, the optical transmission system comprises a separation part 60, amplification parts 61 and 62, electrical/optical conversion parts 63 and 64, a wavelength division multiplexing part 65, a wavelength division demultiplexing part 66 and optical/electrical conversion parts 67 and 68. The separation part 60, the amplification parts 61 and 62, the electrical/optical conversion parts 63 and 64 and the wavelength division multiplexing part 65 are provided at a sending end, and the wavelength division demultiplexing part 66 and the optical/electrical conversion parts 67 and 68 are provided at a receiving end.

The system of FIG. 7 is applied to a radio base station similar to that in FIG. 2 (refer to the first embodiment). The optical transmission system of FIG. 7 is applied to the radio base station of FIG. 2, for performing signal transmission between the master station 20 and the slave station 21. That is, the system converts an input signal including an RF signal employed in the current system and a code division multiple access signal employed in the CDMA system to an optical signal and transmits the same through the optical fiber 22.

Referring again to FIG. 7, the separation part 60 separates the input signal into the RF signal and the code division multiple access signal. The amplification part 61 amplifies the RF signal to be transmitted. The amplification part 62 amplifies the code division multiple access signal to be transmitted. The electrical/optical conversion part 63 performs electrical/optical conversion of the amplified RF signal. The electrical/optical conversion part 64 performs electrical/optical conversion of the amplified code division multiple access signal. The wavelength division multiplexing part 65 multiplexes the optical signal (output signal of the electrical/optical conversion part 63) corresponding to the RF signal and the optical signal (output signal of the electrical/optical conversion part 64) corresponding to the code division multiple access signal. The wavelength division demultiplexing part 66 separates the transmitted optical signal (output signal of the wavelength division multiplexing part 65) into the optical signal corresponding to the RF signal and the optical signal corresponding to the code division multiple access signal. The optical/electrical conversion part 67 performs optical/electrical conversion of the optical signal corresponding to the RF signal. The optical/electrical conversion part 68 performs optical/electrical conversion of the optical signal corresponding to the code division multiple access signal.

The electrical/optical conversion part 63 has, in relation to the power of the input signal, such a prescribed linear region that change of the strength of the output optical signal with respect to change thereof is linear. That is, when a signal having power exceeding the upper limit of this region is inputted in the electrical/optical conversion part 63, the output optical signal is distorted.

The electrical/optical conversion part 64 has, in relation to the power of the input signal, such another prescribed linear region that change of the strength of the output optical signal with respect to change thereof is linear. That is, when a signal having power exceeding the upper limit of this region is inputted in the electrical/optical conversion part 64, the output optical signal is distorted.

The optical/electrical conversion part 67 has, in relation to the strength of the input optical signal, such still another prescribed linear region that change of the power of the output signal with respect to change thereof is linear. That is, when an optical signal having strength exceeding the upper limit of this region is inputted in the optical/electrical conversion part 67, the output signal is distorted.

The optical/electrical conversion part 68 has, in relation to the strength of the input optical signal, such a further prescribed linear region that change of the power of the output signal with respect to change thereof is linear. That is, when an optical signal having strength exceeding the upper limit of this region is inputted in the optical/electrical conversion part 68, the output signal is distorted.

The amplification part 61 performs amplification with such an amplification factor that the power of the RF signal included in the output signal from the optical/electrical conversion part 67 becomes sufficiently larger than that of noise. Thus, the receiving end can obtain an RF signal having sufficiently large power as compared with noise (i.e., having an excellent C/N ratio).

Most preferably, the amplification part 61 performs amplification with the aforementioned amplification factor, which is such an amplification factor that the power of the input signal in the electrical/optical conversion part 63 will not exceed the upper limit of the aforementioned prescribed linear region and the strength of the input optical signal in the optical/electrical conversion part 67 will not exceed the upper limit of the aforementioned still another prescribed linear region. Thus, the receiving end can obtain an RF signal having sufficiently large power as compared with noise and with no distortion.

The amplification part 62 performs amplification with such an amplification factor that the power of the code division multiple access signal included in the output signal from the optical/electrical conversion part 68 becomes sufficiently larger than that of noise. Thus, the receiving end can obtain a code division multiple access signal having sufficiently large power as compared with noise (i.e., having an excellent C/N ratio).

Most preferably, the amplification part 62 performs amplification with the aforementioned amplification factor, which is such an amplification factor that the power of the input signal in the electrical/optical conversion part 64 will not exceed the upper limit of the aforementioned another prescribed linear region and the strength of the input optical signal in the optical/electrical conversion part 68 will not exceed the upper limit of the aforementioned further prescribed linear region. Thus, the receiving end can obtain a code division multiple access signal having sufficiently large power as compared with noise and with no distortion.

If the optical/electrical conversion parts (67 and 68) have sufficiently wide linear regions, the wavelength division demultiplexing part 66 may be omitted for collectively receiving in either optical/electrical conversion part both of the RF signal and the code division multiple access signal.

It is supplemented here that the optical/electrical conversion part 67 or 68 may be, similarly to the optical/electrical conversion part 15 of FIG. 1 as shown in FIGS. 3A and 3B, formed by a single optical/electrical conversion device 30 or formed by an optical/electrical conversion device 30 and an amplifier (preamplifier) 31 previously amplifying an output signal of the optical/electrical conversion device 30. In general, the optical/electrical conversion device 30 has a sufficiently wide linear region, while the amplifier 31 has a rather narrow linear region.

Hence, in the former case, i.e., when the optical/electrical conversion part 67 or 68 is formed by the single optical/electrical conversion device 30, the amplification factor may not be intentionally adjusted since there is a bare possibility that the strength of the input optical signal in the optical/electrical conversion part 67 or 68 exceeds the upper limit of the aforementioned still another prescribed linear region. However, in the latter case, i.e., when the optical/electrical conversion part 67 or 68 is formed by the optical/electrical conversion device 30 and the amplifier 31, it is necessary to intentionally adjust the amplification factor, so that the strength of the input optical signal in the optical/electrical conversion part 67 or 68 will not exceed the upper limit of the aforementioned still another prescribed linear region.

As to the optical transmission system having the aforementioned structure, operations when applied to the radio base station of FIG. 2 are now described.

First, operations of transmitting a signal from the slave station 21 to the master station 20 are described.

Figure 8:
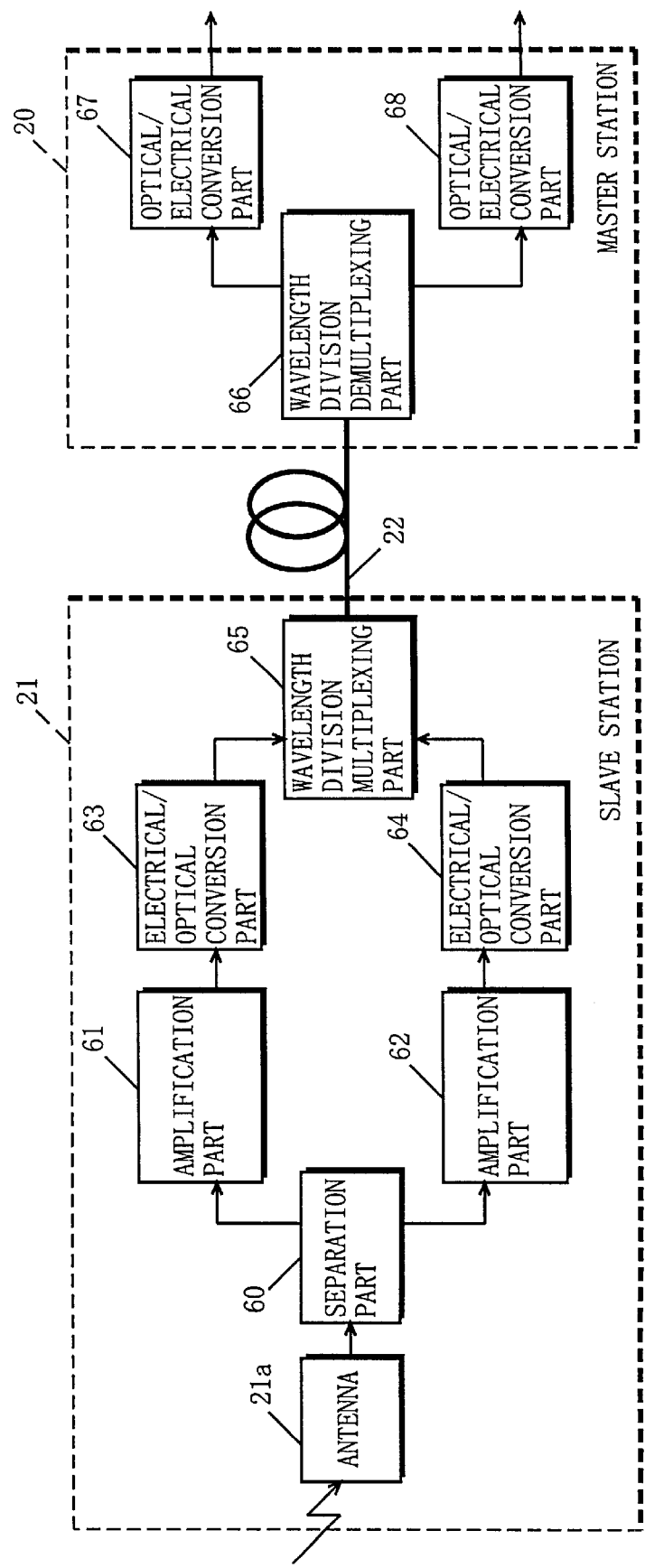
FIG. 8 is a block diagram showing an exemplary structure of the radio base station of FIG. 2 to which the optical transmission system of FIG. 7 is applied (the case of transmitting the signal from the slave station 21 to a master station 20)

FIG. 8 is a block diagram showing an exemplary structure of the radio base station of FIG. 2 to which the optical transmission system of FIG. 7 is applied. FIG. 8 shows elements necessary when transmitting a signal from the slave station 21 to the master station 20. Referring to FIG. 8, the slave station 21 comprising the antenna 21$a$ is provided with the separation part 60, the amplification parts 61 and 62, the electrical/optical conversion parts 63 and 64 and the wavelength division multiplexing part 65 of FIG. 7, and the master station 20 is provided with the wavelength division demultiplexing part 66 and the optical/electrical conversion parts 67 and 68.

In a talking area of the slave station 21, a mobile terminal for the current system and a mobile terminal for the CDMA system are mixedly provided (not shown). From these mobile terminal ends, an RF signal and a code division multiple access signal are sent toward the slave station 21. In the slave station 21, these RF signal and code division multiple access signal are received by the antenna 21a and inputted in the separation part 60. The separation part 60 separates the input signal including the RF signal and the code division multiple access signal into the RF signal and the code division multiple access signal.

The separation part 60 can be implemented by employing a divider branching the input signal into two signals and filters selectively transmitting signals of specific frequencies, for example (refer to FIG. 5).

The RF signal obtained by separation is supplied to the amplification part 61, and amplified there. On the other hand, the code division multiple access signal obtained by separation is supplied to the amplification part 62, and amplified there. The electrical/optical conversion part 63 performs electrical/optical conversion of the amplified RF signal. The electrical/optical conversion part 64 performs electrical/optical conversion of the amplified code division multiple access signal. The output signal of the electrical/optical conversion part 63 and the output signal of the electrical/optical conversion part 64 are multiplexed in the wavelength division multiplexing part 65, and radiated into the optical fiber 22.

The optical signal outputted from the slave station 21 in the aforementioned manner propagates in the optical fiber 22 and reaches the master station 20. In the master station 20, the wavelength division demultiplexing part 66 separates the optical signal from the slave station 21 into an optical signal corresponding to the RF signal and an optical signal corresponding to the code division multiple access signal.

The wavelength division demultiplexing part 66 can be implemented by employing a divider branching the input signal into two signals and filters selectively transmitting optical signals of specific wavelengths, for example.

The optical signal corresponding to the RF signal is subjected to optical/electrical conversion in the optical/electrical conversion part 67. The optical signal corresponding to the code division multiple access signal is subjected to optical/electrical conversion in the optical/electrical conversion part 68. Thus, the RF signal and the code division multiple access signal are obtained.

In the aforementioned operations, the amplification part 61 performs amplification with such an amplification factor that the power of the output signal (RF signal) from the optical/electrical conversion part 67 becomes sufficiently larger than that of noise and the power of the input signal in the electrical/optical conversion part 63 will not exceed the upper limit of the linear region of the electrical/optical conversion part 63 while the strength of the input optical signal in the optical/electrical conversion part 67 will not exceed the upper limit of the linear region of the optical/electrical conversion part 67, whereby the RF signal obtained in the master station 20 has sufficiently large power as compared with noise, and is not distorted.

Further, the amplification part 62 is set at such a value that the power of the output signal (code division multiple access signal) from the optical/electrical conversion part 68 becomes sufficiently larger than that of noise and the power of the input signal in the electrical/optical conversion part 64 will not exceed the upper limit of the linear region of the electrical/optical conversion part 64 while the strength of the input optical signal in the optical/electrical conversion part 68 will not exceed the upper limit of the linear region of the optical/electrical conversion part 68, whereby the code division multiple access signal obtained in the master station 20 has sufficiently large power as compared with noise and is not distorted.

The amplification factors of the amplification parts 61 and 62 may be respectively fixed at predetermined values or may be adjusted during transmission in response to change of C/N ratios and distortion quantities.

Operations of transmitting a signal from the master station 20 to the slave station 21 are now described.

Figure 9:
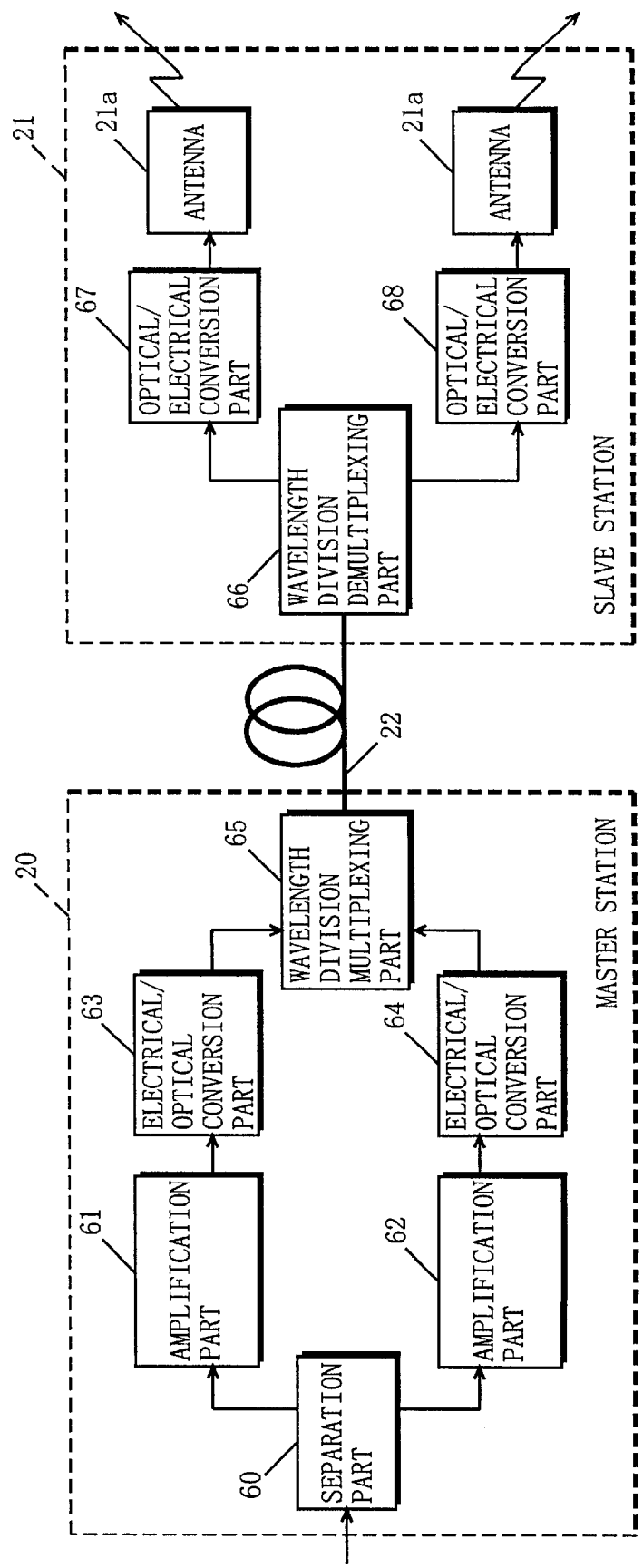
FIG. 9 is a block diagram showing another exemplary structure of the radio base station of FIG. 2 to which the optical transmission system of FIG. 7 is applied (the case of transmitting a signal from the master station 20 to the slave station 21)

FIG. 9 is a block diagram showing another exemplary structure of the radio base station of FIG. 2 to which the optical transmission system of FIG. 7 is applied. FIG. 9 shows elements necessary when transmitting a signal from the master station 20 to the slave station 21. Referring to FIG. 9, the slave station 21 comprising a pair of antennas 21a is provided with the wavelength division demultiplexing part 66 and the optical/electrical conversion parts 67 and 68 of FIG. 7, and the master station 20 is provided with the separation part 60, the amplification parts 61 and 62, the electrical/optical conversion parts 63 and 64 and the wavelength division multiplexing part 65.

To the master station 20, a signal including an RF signal and a code division multiple access signal is transmitted from a center station (not shown) through a prescribed transmission path. In the master station 20, the separation part 60 separates the signal from the center station into the RF signal and the code division multiple access signal.

The RF signal obtained by separation is supplied to the amplification part 61, and amplified there. On the other hand, the code division multiple access signal obtained by separation is supplied to the amplification part 62, and amplified there. The electrical/optical conversion part 63 performs electrical/optical conversion of the amplified RF signal. The electrical/optical conversion part 64 performs electrical/optical conversion of the amplified code division multiple access signal. The output signal of the electrical/optical conversion part 63 and the output signal of the electrical/optical conversion part 64 are multiplexed in the wavelength division multiplexing part 65, and radiated into the optical fiber 22.

The optical signal outputted from the master station 20 as in the aforementioned manner propagates in the optical fiber 22 and reaches the slave station 21. In the slave station 21, the wavelength division demultiplexing part 66 separates the optical signal from the master station 20 into an optical signal corresponding to the RF signal and an optical signal corresponding to the code division multiple access signal. The optical signal corresponding to the RF signal is subjected to optical/electrical conversion in the optical/electrical conversion part 67. The optical signal corresponding to the code division multiple access signal is subjected to optical/electrical conversion in the optical/electrical conversion part 68. Thus, the RF signal and the code division multiple access signal are obtained. From the slave station 21, the RF signal and the code division multiple access signal obtained in the aforementioned manner are sent through the pair of antennas 21a toward each mobile terminal in the talking area of the slave station 21.

In the aforementioned operations, the amplification part 61 performs amplification with such an amplification factor that the power of the RF signal outputted from the optical/ electrical conversion part 67 becomes sufficiently larger than that of noise and the power of the input signal in the electrical/optical conversion part 63 will not exceed the upper limit of the linear region of the electrical/optical conversion part 63 while the strength of the input optical signal in the optical/electrical conversion part 67 will not exceed the upper limit of the linear region of the optical/electrical conversion part 67, whereby the RF signal obtained in the slave station 21 has sufficiently large power as compared with noise and is not distorted.

Further, the amplification part 62 performs amplification with such an amplification factor that the power of the code division multiple access signal outputted from the optical/electrical conversion part 68 becomes sufficiently larger than that of noise and the power of the input signal in the electrical/optical conversion part 64 will not exceed the upper limit of the linear region of the electrical/optical conversion part 64 while the strength of the input optical signal in the optical/electrical conversion part 68 will not exceed the upper limit of the linear region of the optical/electrical conversion part 68, whereby the code division multiple access signal obtained in the slave station 21 has sufficiently large power as compared with noise and is not distorted.

The amplification factors of the amplification parts 61 and 62 may be respectively fixed at predetermined values or may be adjusted during transmission in response to change of C/N ratios and distortion quantities, similarly to the case of transmitting the signal from the slave station 21 to the master station 20.

According to the second embodiment, as hereinabove described, when transmitting the signal including the RF signal and the code division multiple access signal, the signal is separated into the RF signal and the code division multiple access signal to be amplified with amplification factors suitable for the respective power and transmitted, whereby the RF signal and the code division multiple access signal obtained at the receiving end both have sufficiently large power as compared with noise and are not distorted.

In the first embodiment, the RF signal and the code division multiple access signal obtained by separation are both converted in the electrical/optical conversion part 14 and the optical/electrical conversion part 15, while in the second embodiment the RF signal obtained by separation is converted in the electrical/optical conversion part 63 and the optical/electrical conversion part 67 and the code division multiple access signal obtained by separation is converted in the electrical/optical conversion part 64 and the optical/electrical conversion part 68 respectively. Hence, the second embodiment is, as compared with the first embodiment, slightly complicated in structure. However, when C/N ratios and distortion characteristics of about the same degrees are to be obtained, the second embodiment may have lower upper limits of the linear regions of the electrical/optical conversion parts and the optical/electrical conversion parts than the first embodiment. This is because the power of the input signal in the electrical/optical conversion part 63 and the power of the input signal in the electrical/optical conversion part 64 respectively become smaller than the power of the input signal in the electrical/optical conversion part 14, and the strength of the input optical signal in the optical/electrical conversion part 67 and the strength of the input optical signal in the optical/electrical conversion part 68 respectively become smaller than the strength of the input optical signal in the optical/electrical conversion part 15.

(Third Embodiment)

Figure 10:
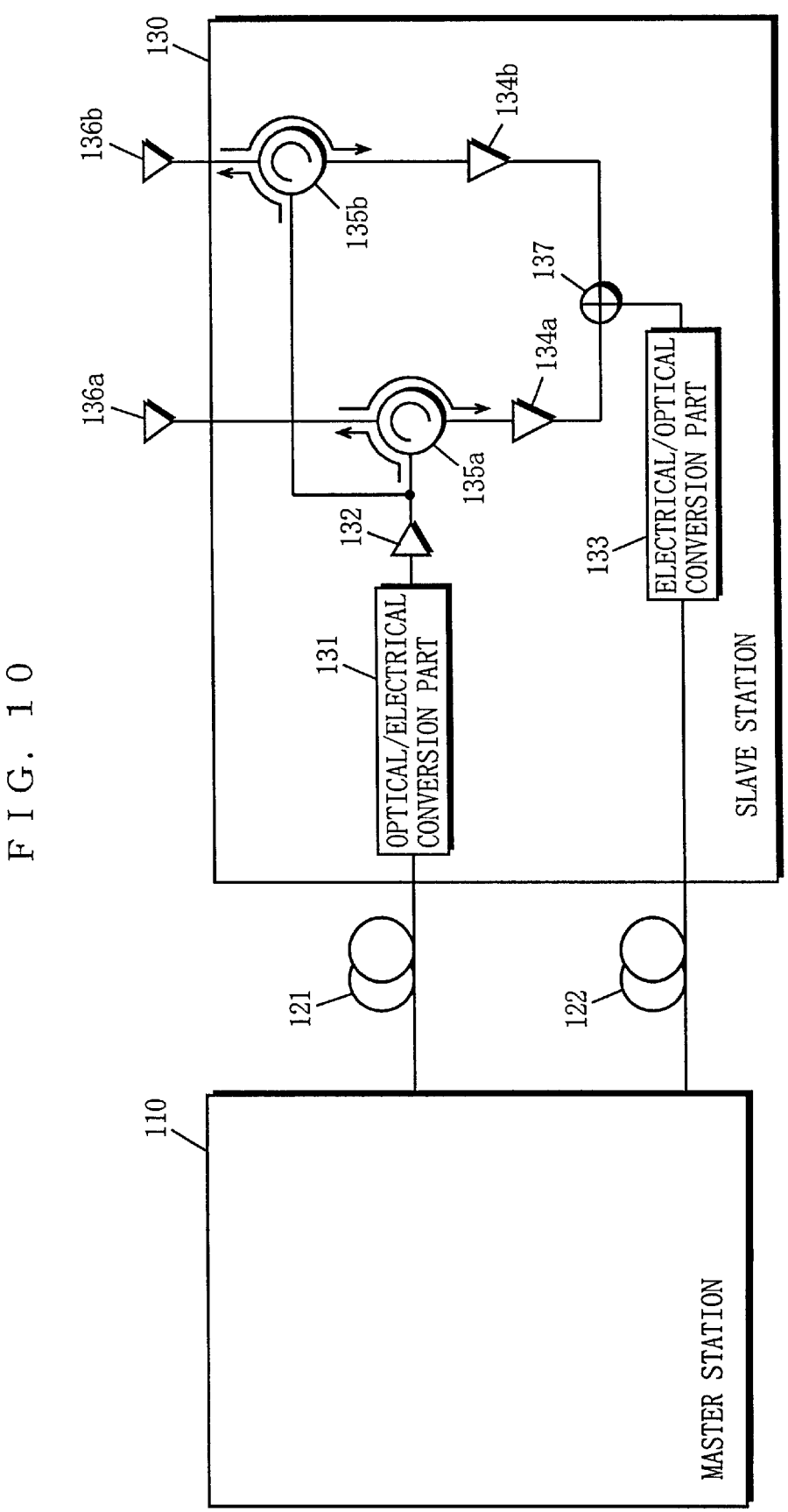
FIG. 10 is a block diagram showing the structure of a radio signal transmitter according to a third embodiment of the present invention.

FIG. 10 is a block diagram showing the structure of a radio signal transmitter according to a third embodiment of the present invention. Referring to FIG. 10, in this radio signal transmitter a master station 110 and a slave station 130 are connected by optical fibers 121 and 122.

The slave station 130 comprises an optical/electrical conversion part 131, an electrical/optical conversion part 133, a first amplification part 132, a second amplification part 134*a*, a third amplification part 134*b*, a first circulator 135*a*, a second circulator 135*b*, a combiner 137, a first antenna 136*a* and a second antenna 136*b*.

The second amplification part 134*a*, the first circulator 135*a* and the first antenna 136 process a signal with a first frequency band (a frequency band utilized in conventional radio communication service). This signal with the first frequency band is not subjected to power control when sent from a first mobile terminal.

On the other hand, the third amplification part 134*b*, the second circulator 135*b* and the second antenna 136*b* process a signal with a second frequency band (a frequency band utilized for performing new radio communication service). This signal with the second frequency band is subjected to power control when sent from a second mobile terminal. This second frequency band may be simply different from the first frequency band, and there is no particular restriction in allocation.

Figure 11:
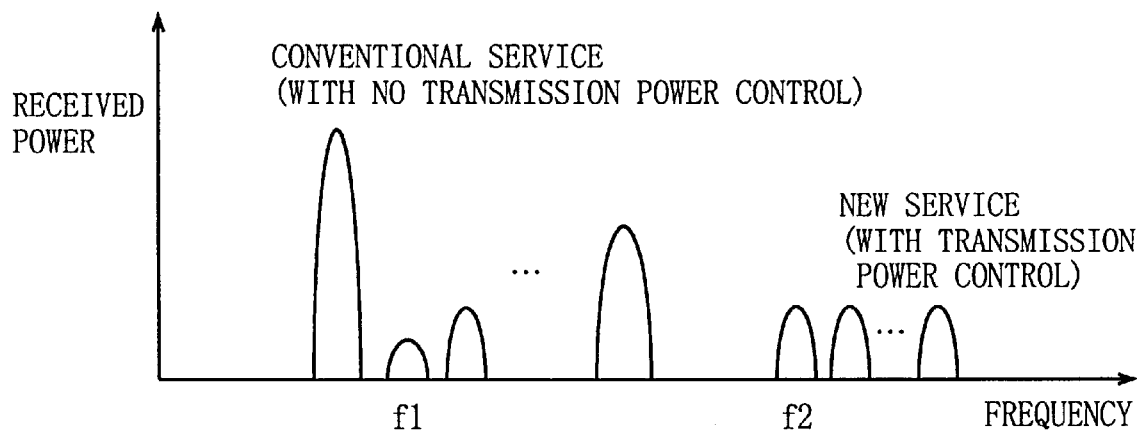
FIG. 11 is a diagram showing exemplary relation between frequencies of signals received in a first antenna 36a and a second antenna 36b and received power.

FIG. 11 shows exemplary relation between the frequencies and received power of the signals received by the first antenna 136*a* and the second antenna 136*b*.

First, down system signal transmission is described.

An optical signal sent from the master station 110 is transmitted through the optical fiber 121 to the slave station 130 present on a remote site. In the slave station 130, the optical/electrical conversion part 131 receives the optical signal sent from the master station 110 and converts the same to a radio modulation signal which is an electric signal. The first amplification part 132 amplifies and outputs this radio modulation signal. The amplified radio modulation signal is radiated through the circulator 135*a* from the antenna 136*a* if this is a radio modulation signal with the first frequency band (hereinafter referred to as a first radio modulation signal), or radiated through the circulator 135*b* from the antenna 136*b* if this is a radio modulation signal with the second frequency band (hereinafter referred to as a second radio modulation signal). The first and second radio modulation signals radiated from the antennas 136*a* and 136*b* are received by corresponding first and second mobile terminals (not shown) in the area respectively.

Up system signal transmission is now described.

The first radio modulation signal sent from each first mobile terminal in the area is received by the first antenna 136*a* and thereafter frequency-multiplexed. As hereinabove described, the first radio modulation signal is not subjected to power control when sent from the first mobile terminal, and hence dispersion takes place in the received power due to the difference in distance between each first mobile terminal and the slave station 130.

The frequency-multiplexed first radio modulation signal is inputted through the circulator 135*a* in the second amplification part 134*a*. The second amplification part 134*a* amplifies the inputted first radio modulation signal and outputs the same to the combiner 137.

On the other hand, the second radio modulation signal sent from each second mobile terminal in the area is received by the second antenna 136*b* and thereafter frequency-multiplexed. As hereinabove described, the second radio modulation signal is subjected to power control when sent from the second mobile terminal, and hence the received power in the slave station 130 reaches a constant level without depending on the difference in distance between each second mobile terminal and the slave station 130.

The frequency-multiplexed second radio modulation signal is inputted through the circulator 135*b* in the third amplification part 134*b*. The third amplification part 134*b* amplifies the inputted second radio modulation signal and outputs the same to the combiner 137. At this time, the third amplification part 134*b* performs amplification so that the level of the amplified second radio modulation signal becomes smaller than the level of the first radio modulation signal after amplification by the second amplification part 134*a*.

The combiner 137 multiplexes the first radio modulation signal outputted from the second amplification part 134*a* and the second radio modulation signal outputted from the third amplification part 134*b* and outputs the same to the electrical/optical conversion part 133. The electrical/optical conversion part 133 receives the multiplexed radio modulation signal, converts the same to an optical signal and outputs the same. The optical signal outputted after converted in this electrical/optical conversion part 133 is transmitted through the optical fiber 122 to the master station 110 present on a remote site.

Thus, when sharing the existing radio signal transmitter between a communication system with an existing frequency band and a communication system with another frequency band, a signal subjected to control of transmission power is employed as a signal employed for the communication system with another frequency band. When performing control of the transmission power of the signal, reduction of the dynamic range is enabled as compared with the conventional case of performing no transmission power control. Therefore, it is possible to set the optical modulation index in the case of performing control of the transmission power small as compared with the case of performing no control of the transmission power, and even if employing two communication systems, the transmission characteristics of the overall communication systems remain substantially unchanged as compared with the conventional case of one communication system, and increase of the number of transmission carriers is enabled.

The above is verified employing the equation (1) and the equation (2) described in relation to the aforementioned prior art.

The conventional radio signal transmitter not controlling transmission power has required a wide dynamic range reaching 60 dB. In the case of the signal performing new service this time, transmission power from each mobile terminal (second mobile terminal) is controlled and hence the wide dynamic range reaching 60 dB becomes unnecessary. Assuming that the dynamic range of the new service is 20 dB, for example, the signal level can be reduced by 40 dB as compared with the case that the dynamic range is 60 dB, and the optical modulation index at this time becomes 1/100 as compared with the case of performing no control of the transmission power.

Figure 12:
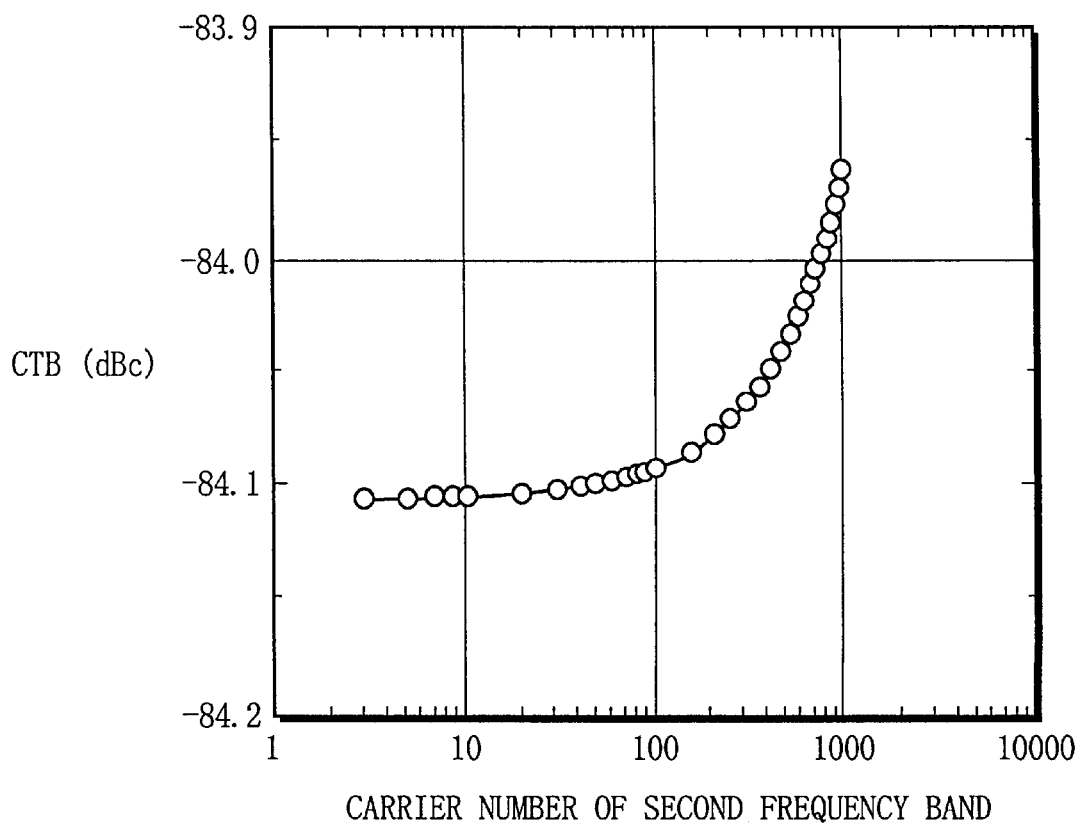
FIG. 12 is a diagram showing the relation between a carrier number of a second frequency band and distortion CTB.
Figure 13:
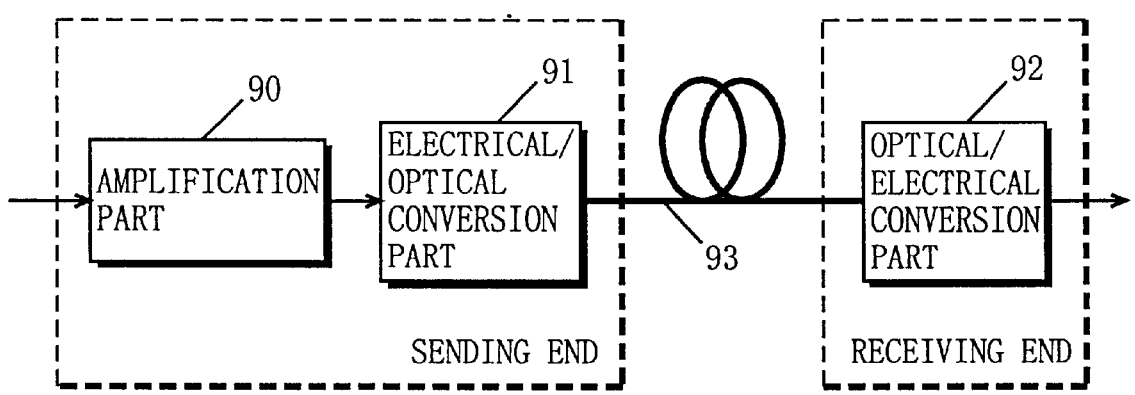
FIG. 13 is a block diagram showing an exemplary structure of a conventional optical transmission system employed in a radio base station formed by a master station without an antenna function and a plurality of slave stations (forward stations) having only the antenna function for optically transmitting signals between the master station and the slave stations.
Figure 14:
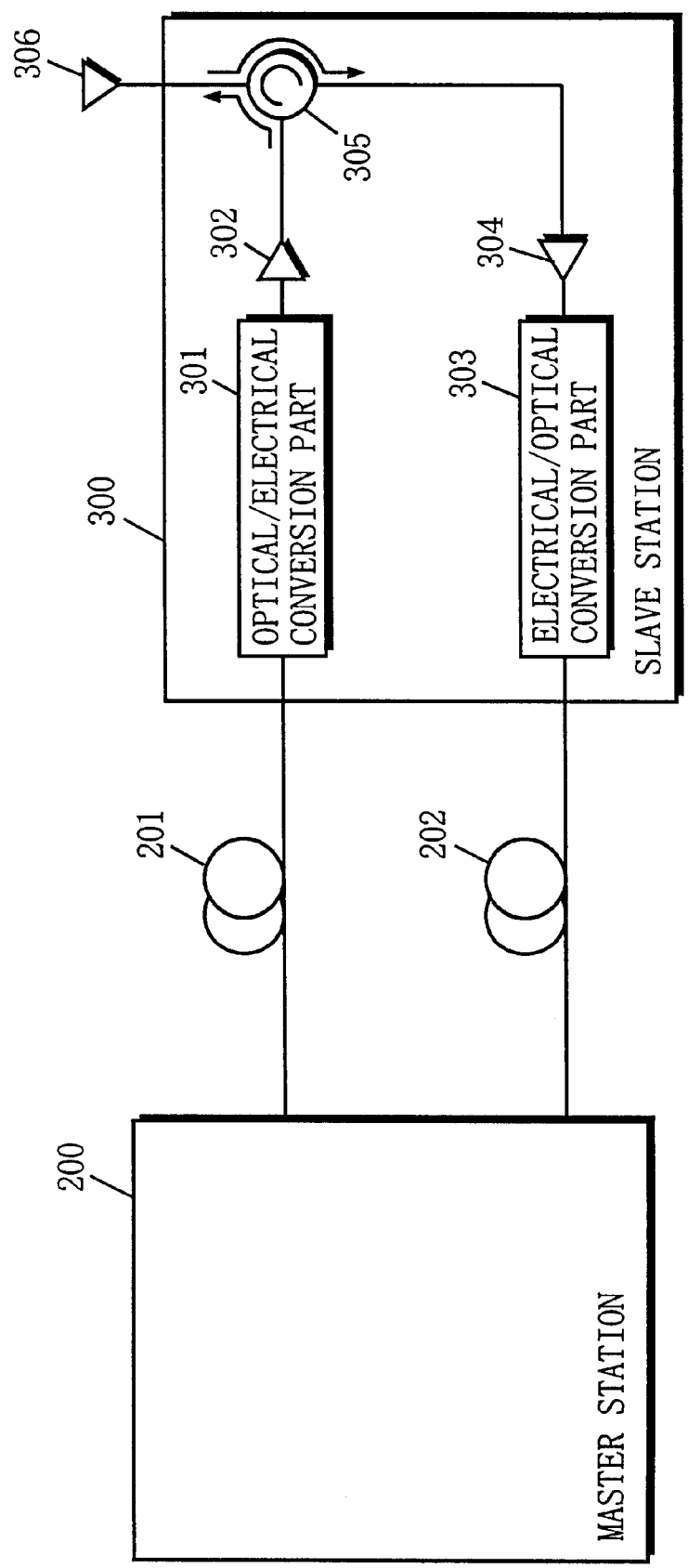
FIG. 14 is a block diagram showing an exemplary structure of a conventional radio signal transmitter.
Figure 15:
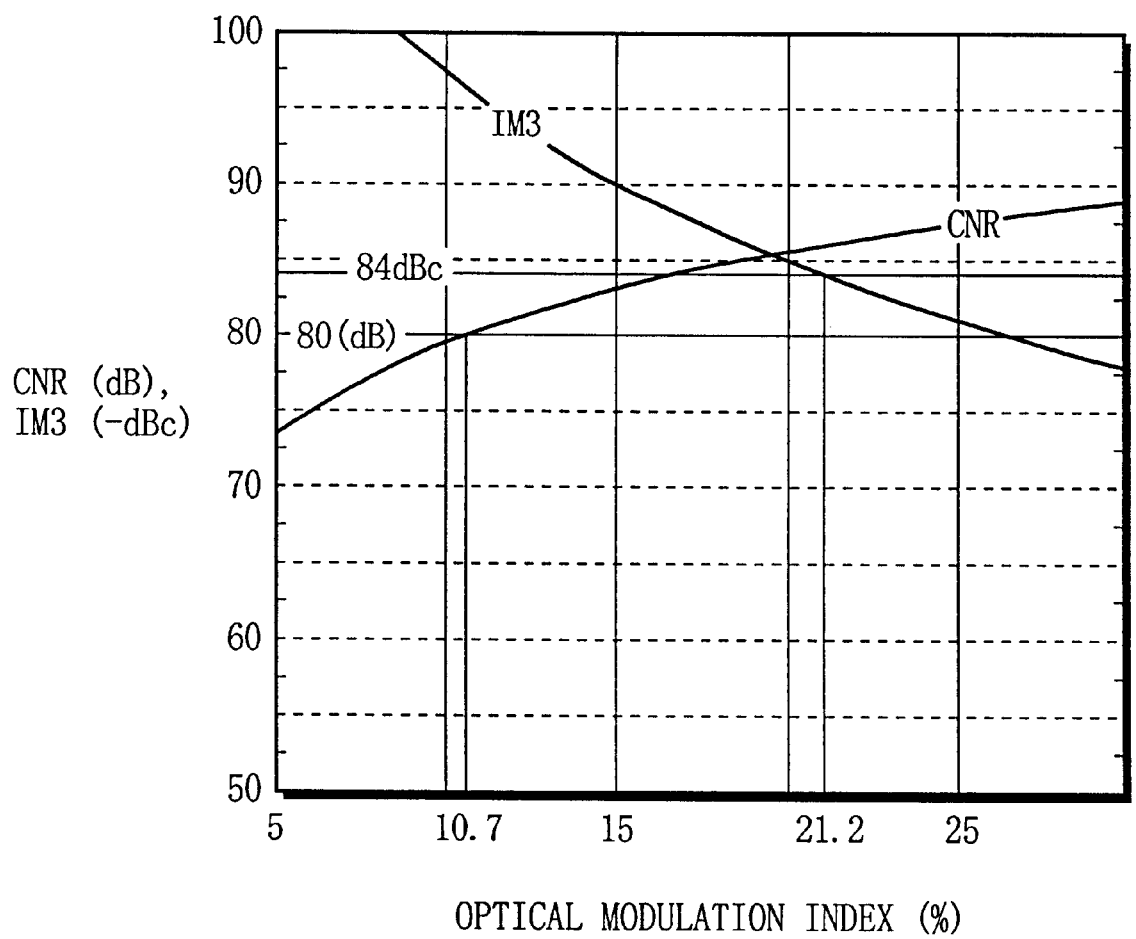
FIG. 15 is a diagram showing the relation between a optical modulation index, CNR and distortion.
Figure 16:
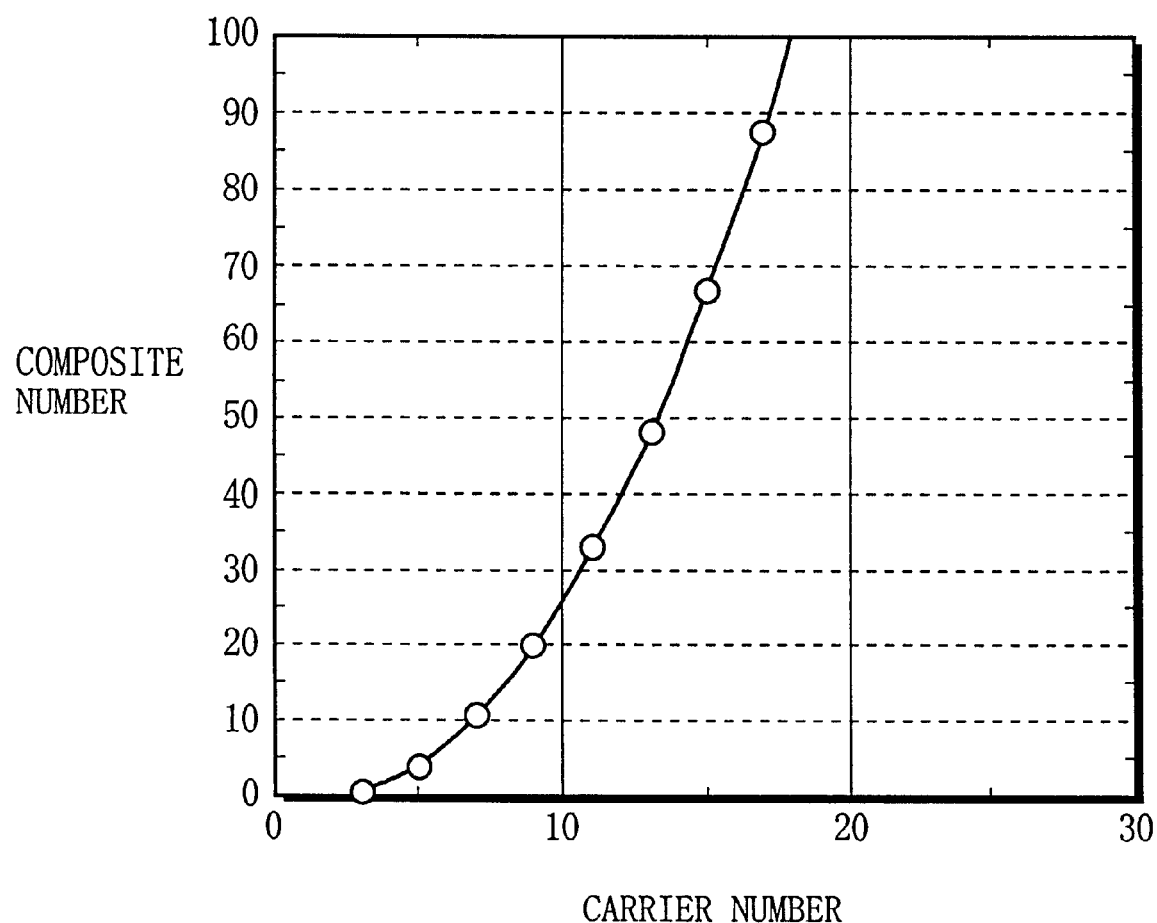
FIG. 16 is a diagram showing the relation between a carrier number and a composite number.
Figure 17:
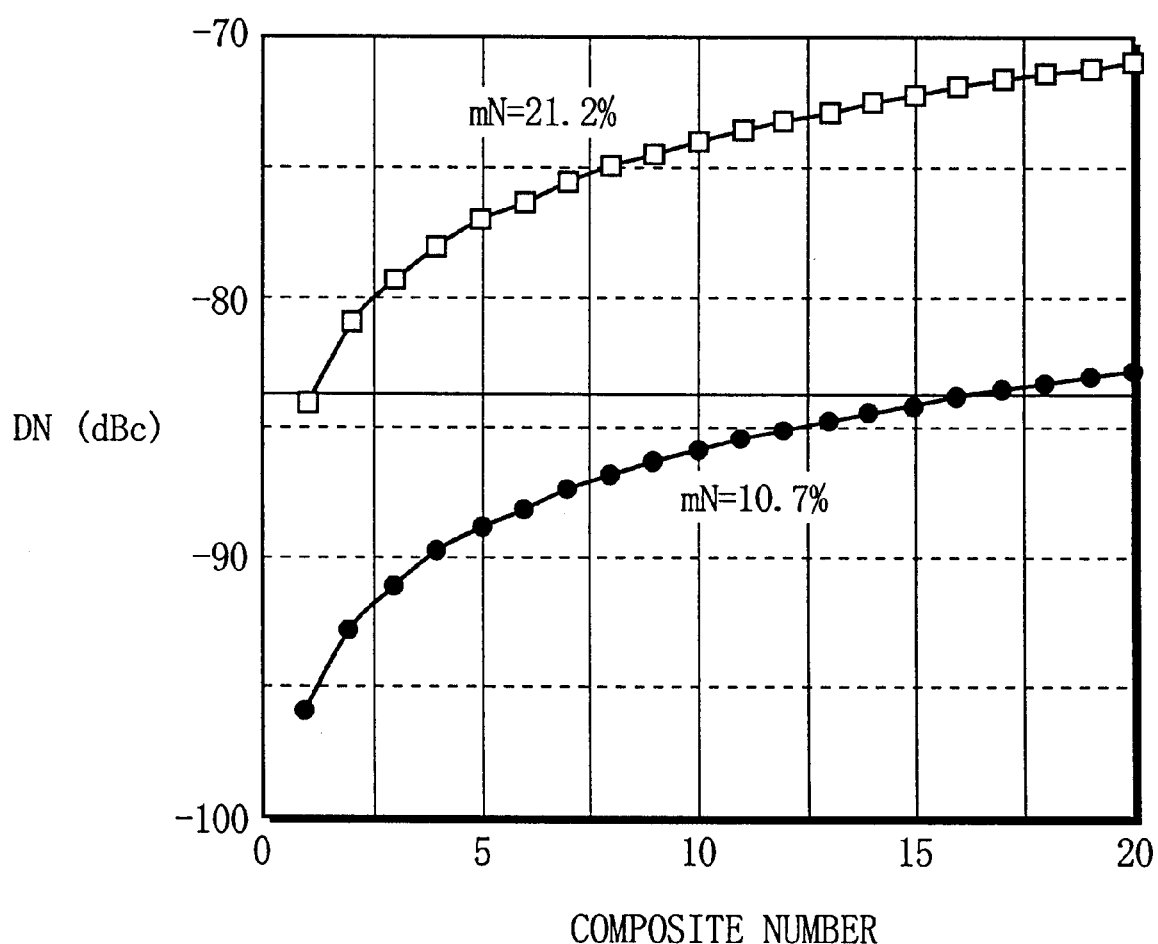
FIG. 17 is a diagram showing the relation between the composite number and a distortion quantity DN.

Assuming that the carrier number N is "8" which is the number of mobile terminals capable of simultaneous talking from places close to the slave station 300 in the conventional radio signal transmitter, calculation of the distortion characteristic in the case of newly frequency-multiplexing a signal with the second frequency band this time is performed. FIG. 12 shows the calculation result.

As obvious from FIG. 12, the distortion characteristic is not degraded even if frequency-multiplexing the signal with the second frequency band on the signal with the first frequency band, and the number of carriers capable of transmitting the signal with the second frequency band reaches 700.

As hereinabove described, according to the radio signal transmitter according to the third embodiment of the present invention, transmission characteristics of the overall two communication systems can be substantially the same as the transmission characteristic of only the conventional one communication system with only slight change in the slave station 130. Therefore, increase of the transmission carrier number is enabled while the cost required for introduction of the new communication system can be remarkably reduced.

When employing as the signal sent from the aforementioned second mobile terminal a signal subjected to code division multiple access by the CDMA (code division multiple access) system, for example, the following effect is further generated:

The signal subjected to code division multiple access has such a characteristic that the band is wide and peak power is low, and hence a distortion signal generated from the second radio modulation signal also has a wide band and an extremely low peak power. Therefore, even if distortion is caused in the frequency band of the first radio modulation signal, this exerts no influence on the first radio modulation signal. Therefore, when employing a signal subjected to code division multiple access, influence exerted on the first radio modulation signal by frequency-multiplexing the second radio modulation signal on the first radio modulation signal can be further reduced.

(Fourth Embodiment)

An optical transmission system according to a fourth embodiment of the present invention has the same structure as the optical transmission system according to the first embodiment (refer to FIG. 1) except that the separation part 10 is eliminated.

The operation of the optical transmission system according to the fourth embodiment is identical to that of the optical transmission system according to the first embodiment expect for the following points.

To the optical transmission system according to the fourth embodiment, an RF signal and a code division multiple access signal are inputted separately, that is, in a state where the two signals are previously separated from each other. The optical transmission system according to the fourth embodiment then amplifies the RF signal and code division multiple access signal with amplification factors related to the power of the respective signals and transmits the same.

(Fifth Embodiment)

An optical transmission system according to a fifth embodiment of the present invention has the same structure as the optical transmission system according to the second embodiment (refer to FIG. 7) except that the separation part 60 is eliminated.

The operation of the optical transmission system according to the fifth embodiment is identical to that of the optical transmission system according to the second embodiment except for the following points.

To the optical transmission system according to the fifth embodiment, an RF signal and a code division multiple access signal are inputted separately, that is, in a state where the two signals are previously separated from each other. The optical transmission system according to the fifth embodiment then amplifies the RF signal and code division multiple access signal with amplification factors related to the power of the respective signals and transmits the same.

While the invention has been described in detail, the foregoing description is in all aspects illustrative and not restrictive. It is understood that numerous other modifications and variations can be devised without departing from the scope of the invention.

What is claimed is:

1. A radio signal transmitter for transmitting a signal including both of a radio signal being in a first frequency band and not subjected to transmission power limitation (hereinafter referred to as a first radio signal) and a radio signal being in a second frequency band different from the first frequency band and subjected to transmission power limitation (hereinafter referred to as a second radio signal), comprising at a sending end:

a separation part separating said signal into the first radio signal and the second radio signal;

a first amplification part amplifying said first radio signal with an amplification factor related to the power of the first radio signal;

a second amplification part amplifying said second radio signal with an amplification factor related to the power of the second radio signal; and a combination part combining amplified said first radio signal and amplified said second radio signal.

2. The radio signal transmitter in accordance with claim 1, further comprising at the sending end an electrical/optical conversion part performing electrical/optical conversion of an output signal of said combination part, and comprising at a receiving end an optical/electrical conversion part performing optical/electrical conversion of an output optical signal of said electrical/optical conversion part, wherein the sending end and the receiving end are connected to each other by an optical fiber.

3. The radio signal transmitter in accordance with claim 1, wherein said second radio signal is a signal subjected to code division multiple access.

4. The radio signal transmitter in accordance with claim 3, further comprising at the sending end an electrical/optical conversion part performing electrical/optical conversion of an output signal from said combination part, and comprising at a receiving end an optical/electrical conversion part performing optical/electrical conversion of an output optical signal of said electrical/optical conversion part, wherein the sending end and the receiving end are connected to each other by an optical fiber.

5. The radio signal transmitter in accordance with claim 4, wherein said first amplification part and said second amplification part respectively further perform amplification with such amplification factors that the strength of an input optical signal in said optical/electrical conversion part will not exceed the upper limit of a linear region of the optical/electrical conversion part.

6. The radio signal transmitter in accordance with claim 5, wherein said optical/electrical conversion part is formed by an optical/electrical conversion device and an amplifier previously amplifying an output signal of the optical/electrical conversion device.

7. The radio signal transmitter in accordance with claim 4, wherein said first amplification part and said second amplification part respectively further perform amplification with such amplification factors that the power of an input signal in said electrical/optical conversion part will not exceed the upper limit of a linear region of the electrical/optical conversion part.

8. The radio signal transmitter in accordance with claim 7, wherein said first amplification part and said second amplification part respectively further perform amplification with such amplification factors that the strength of an input optical signal in said optical/electrical conversion part will not exceed the upper limit of a linear region of the optical/electrical conversion part.

9. The radio signal transmitter in accordance with claim 8, wherein said optical/electrical conversion part is formed by an optical/electrical conversion device and an amplifier previously amplifying an output signal of the optical/electrical conversion device.

10. A radio signal transmitter for transmitting a signal including both of a radio signal being in a first frequency band and not subjected to transmission power limitation (hereinafter referred to as a first radio signal) and a radio signal being in a second frequency band different from the first frequency band and subjected to transmission power limitation (hereinafter referred to as a second radio signal), wherein a sending end and a receiving end are connected to each other by an optical fiber, said radio signal transmitter comprising at the sending end:

a separation part separating said signal into said first radio signal and said second radio signal;

a first amplification part amplifying said first radio signal with an amplification factor related to the power of the first radio signal;

a second amplification part amplifying said second radio signal with an amplification factor related to the power of the second radio signal;

a first electrical/optical conversion part performing electrical/optical conversion of amplified said first radio signal;

a second electrical/optical conversion part performing electrical/optical conversion of amplified said second radio signal; and a wavelength division multiplexing part wavelength-division-multiplexing a first optical signal obtained by conversion through said first electrical/optical conversion part and a second optical signal obtained by conversion through said second electrical/optical conversion part, and comprising at the receiving end:

a wavelength division demultiplexing part wavelength-separating an output optical signal of said wavelength division multiplexing part into said first optical signal and said second optical signal;

a first optical/electrical conversion part performing optical/electrical conversion of said first optical signal; and a second optical/electrical conversion part performing optical/electrical conversion of said second optical signal.

11. The radio signal transmitter in accordance with claim 10, wherein said second radio signal is a signal subjected to code division multiple access.

12. The radio signal transmitter in accordance with claim 11, wherein said first amplification part further performs amplification with such an amplification factor that the strength of an input optical signal in said first optical/electrical conversion part will not exceed the upper limit of a linear region of the first optical/electrical conversion part, and said second amplification part further performs amplification with such an amplification factor that the strength of an input optical signal in said second optical/electrical conversion part will not exceed the upper limit of a linear region of the second optical/electrical conversion part.

13. The radio signal transmitter in accordance with claim 12, wherein said first optical/electrical conversion part and said second optical/electrical conversion part are respectively formed by optical/electrical conversion devices and amplifiers previously amplifying output signals of the optical/electrical conversion devices.

14. The radio signal transmitter in accordance with claim 11, wherein said first amplification part further performs amplification with such an amplification factor that the power of an input signal in said first electrical/optical conversion part will not exceed the upper limit of a linear region of the first electrical/optical conversion part, and said second amplification part further performs amplification with such an amplification factor that the power of an input signal in said second electrical/optical conversion part will not exceed the upper limit of a linear region of the second electrical/optical conversion part.

15. The radio signal transmitter in accordance with claim 14, wherein said first amplification part further performs amplification with such an amplification factor that the strength of an input optical signal in said first optical/electrical conversion part will not exceed the upper limit of a linear region of the first optical/electrical conversion part, and said second amplification part further performs amplification with such an amplification factor that the strength of an input optical signal in said second optical/electrical conversion part will not exceed the upper limit of a linear region of the second optical/electrical conversion part.

16. The radio signal transmitter in accordance with claim 15, wherein said first optical/electrical conversion part and said second optical/electrical conversion part are respectively formed by optical/electrical conversion devices and amplifiers previously amplifying output signals of the optical/electrical conversion devices.

17. A radio signal transmitter for transmitting both of a radio signal being in a first frequency band and not subjected to transmission power limitation (hereinafter referred to as a first radio signal) and a radio signal being in a second frequency band different from the first frequency band and subjected to transmission power limitation (hereinafter referred to as a second radio signal), comprising at a sending end:

a first amplification part amplifying said first radio signal with an amplification factor related to the power of the first radio signal;

a second amplification part amplifying said second radio signal with an amplification factor related to the power of the second radio signal; and a combination part combining amplified said first radio signal and amplified said second radio signal.

18. A radio signal transmitter for transmitting both of a radio signal being in a first frequency band and not subjected to transmission power limitation (hereinafter referred to as a first radio signal) and a radio signal being in a second frequency band different from the first frequency band and subjected to transmission power limitation (hereinafter referred to as a second radio signal), wherein a sending end and a receiving end are connected to each other by an optical fiber, said radio signal transmitter comprising at the sending end:

a first amplification part amplifying said first radio signal with an amplification factor related to the power of the first radio signal;

a second amplification part amplifying said second radio signal with an amplification factor related to the power of the second radio signal;

a first electrical/optical conversion part performing electrical/optical conversion of amplified said first radio signal;

a second electrical/optical conversion part performing electrical/optical conversion of amplified said second radio signal; and a wavelength division multiplexing part wavelength-division-multiplexing a first optical signal obtained by conversion through said first electrical/optical conversion part and a second optical signal obtained by conversion through said second electrical/optical conversion part, and comprising at the receiving end:

a wavelength division demultiplexing part wavelength-separating an output optical signal of said wavelength division multiplexing part into said first optical signal and said second optical signal;

a first optical/electrical conversion part performing optical/electrical conversion of said first optical signal; and a second optical/electrical conversion part performing optical/electrical conversion of said second optical signal.

\* \* \* \* \*